Fig. I

INVENTORS
ROBERT C. ENGELHARDT
JOHN C. KENT
JAMES R. RELYEA
TERRANCE TRICKETT
BY John J. McCormack
ATTORNEY

ENCODING SYSTEM

Filed March 3, 1966 12 Sheets-Sheet 2

| PRINTED CHARACTER | AS IDENTIFIED | CORRECTED CODE | PRINTER "CHARACTER" NO. |
|---|---|---|---|
| | 1000 | 1 0 0 0 | 1 |
| | 1001 | 1 0 0 1 | 2 |
| | 1010 | 1 0 1 0 | 3 |
| | 1011 | 1 0 1 1 | 4 |
| | 1100 | 1 1 0 0 | 5 |
| | 1101 | 1 1 0 1 | 6 |
| | 1110 | 1 1 1 0 | 7 |
| | (1110) | 0 0 0 1 | 8 |
| | (1101) | 0 0 1 0 | 9 |
| | (1100) | 0 0 1 1 | 10 |
| | (1011) | 0 1 0 0 | 11 |
| | (1010) | 0 1 0 1 | 12 |
| | (1001) | 0 1 1 0 | 13 |
| | (1000) | 0 1 1 1 | 14 |
| X | 1111 (OR-0000) | UNRECOGNIZABLE | |
| Y | | | |

INVENTORS
ROBERT C. ENGELHARDT
JOHN C. KENT
JAMES R. RELYEA
TERRANCE TRICKETT

BY John J. McConnell

ATTORNEY

INVENTORS
ROBERT C. ENGELHARDT
JOHN C. KENT
JAMES R. RELYEA
TERRANCE TRICKETT

BY John J. McConnell

ATTORNEY

INVENTORS
ROBERT C. ENGELHARDT
JOHN C. KENT
JAMES R. RELYEA
TERRANCE TRICKETT
BY John J. McCormack
ATTORNEY Sept. 15, 1970 J. C. KENT ET AL 3,529,133

ENCODING SYSTEM

Filed March 3, 1966 12 Sheets-Sheet 5

INVENTORS
ROBERT C. ENGELHARDT
JOHN C. KENT
JAMES R. RELYEA
TERRANCE TRICKETT

BY John J. McCormack

ATTORNEY

ENCODING SYSTEM

Filed March 3, 1966 12 Sheets-Sheet 6

INVENTORS
ROBERT C. ENGELHARDT
JOHN C. KENT
JAMES R. RELYEA
TERRANCE TRICKETT

BY John J. McConnell
ATTORNEY

*INVENTORS*
*ROBERT C. ENGELHARDT*
*JOHN C. KENT*
*JAMES R. RELYEA*
*TERRANCE TRICKETT*

*BY* John J. McCormack

*ATTORNEY*

ENCODING SYSTEM

Filed March 3, 1966 12 Sheets-Sheet 8

INVENTORS
ROBERT C. ENGELHARDT
JOHN C. KENT
JAMES R. RELYEA
TERRANCE TRICKETT

BY John J. McCormack

ATTORNEY

INVENTORS
ROBERT C. ENGELHARDT
JOHN C. KENT
JAMES R. RELYEA
TERRANCE TRICKETT
BY John J. McCormack
ATTORNEY

ENCODING SYSTEM

Filed March 3, 1966 12 Sheets-Sheet 10

INVENTORS
ROBERT C. ENGELHARDT
JOHN C. KENT
JAMES R. RELYEA
TERRANCE TRICKETT

BY John J. McCormack

ATTORNEY

INVENTORS
ROBERT C. ENGELHARDT
JOHN C. KENT
JAMES R. RELYEA
TERRANCE TRICKETT
BY John J. McCormack
ATTORNEY INVENTORS
ROBERT C. ENGELHARDT
JOHN C. KENT
JAMES R. RELYEA
TERRANCE TRICKETT
BY John J. McConnell
ATTORNEY

United States Patent Office 3,529,133
Patented Sept. 15, 1970

3,529,133

ENCODING SYSTEM

John C. Kent, Lexington, Robert C. Engelhardt, Waltham, Terrance Trickett, Bedford, and James R. Relyea, Framingham, Mass., assignors to Honeywell Inc., Minneapolis, Minn., a corporation of Delaware

Filed Mar. 3, 1966, Ser. No. 531,441
Int. Cl. G01n *21/30;* G06k *7/10*
U.S. Cl. 235—61.11 17 Claims

ABSTRACT OF THE DISCLOSURE

A code reading system for interpreting bar code charcter patterns aligned along tracks on a document. Translating means propel the document past a read station comprising a plurality of detector means arranged along a read axis for sensing light and dark areas of the bar code patterns. Electronic memory means are connected to receive and store the output of each detector means at successive bit intervals. Control means are provided to interpret the output signals and transmit successive character representing signals to utilization means; the control means including means for selectively inverting the bit signals comprising each character in response to a predetermined directional shift of the output signal pattern.

The instant invention relates to the interpretation of encoded patterns of data marks arranged on documents to convey intelligence; and more particularly to vertical di-bit "bar code" patterns and interpretation means therefor, arranged to uniquely accommodate simplified code-marking and code-interpretation components, while nonetheless allowing relatively sophisticated and unexpectedly versatile performance characteristics, being self-synchronizing (self-clocking), self-checking, self-locating and relatively insensitive to mis-registration, without requiring position referencing means.

Bar code recognition is known and used in the art with some measure of success. Bar code may be understood as an arrangement of detectible "marks" impressed upon a document in a pattern, formed according to prescribed rules; as opposed, for instance, to perforate marks" (holes) cut through a data processing record. The present invention comprises a transducible vertical di-bit bar code comprising two horizontal rows of vertically-paired mark-cells of prescribed reflectivity (e.g. blackness) to be selecttively impressed upon a relatively different reflectivity (e.g. white) document surface; and preferably being "single-hammer-strike"-impressible (e.g. 4-bits impressed with one hammer strike). A vertical di-bit code provides a one doubly-indicated bit (hence, called a "dit-bit") per unt horzontal scan. Thus, one object of the invention is to provide such an encoding scheme. A related object is to provide decoding means therefor.

The novel vertical di-bit bar code pattern of the invention exhibits many practical, convenient characteristics; being especially convenient to interpret, using an unusually simple, yet reliable, logic arrangement. More particularly, it is highly desirable in bar code recognition to devise a code which is self-synchronizing," that is, which, of itself, provides strobe (read-timing) signals, as those skilled in the art will attest. Self-synchronization frees a decoder from record anomalies, i.e. irregularities in the way a document is prepared (e.g. cut and recorded) or manipulated (e.g. transport jitter). For instance, skewed or irregularly spaced characters, that is, characters which are out of prescribed horizontal and/or vertical registration with sensing means, may be accurately detected with a self-synchronizing code; where otherwise they would be unintelligible. Self-synchronization also eliminates dependence of code detectors upon separate strobe clocking means and their susceptibility to errors caused by variations therein. For instance, prior art strobing means are commonly subject to errors resulting from clock drift and variations in trigger threshold with signal amplitude whereas the invention eliminates this.

A bar code should also desirably be self-checking, that is, provide a plurality of detectible bit-indicia, such as complementary pairs of di-bit symbols. The present invention provides such a self-checking bar code. This renders the code more reliable; for instance, the present code marks are internally redundant and can easily be verified by visual inspection, i.e. an attendant can readily spot di-bit code errors like misprints, dirt marks, etc.—something that has not been possible with many bar code schemes. Thus, it is an object of the invention to provide a self-checking, self-synchronizing bar code.

If possible, a bar code should also be "self-locating"; that is, should of itself unmistakably locate the "code track" relative to detecting means. The inventive code does this, allowing decoders to eliminate the customary separate position detecting/referencing means.

It is also advantageous for most bar codes to be bi-directional, or readable backwards; i.e. be practically interpretable whether the read scan is done from left to right or vice versa. Unlike prior art bar code arrangements, that of the invention is both self-locating and bi-directional. Bi-directionality also enables the use of a random, "or open-ended," "field length" and, further, is uniquely suitable for certain applications, such as for reading "returnable-media" where some bar coded documents are best read "upside-down" and backwards from others. Thus, another object of the invention is to provide a bar code that is self-locating and bi-directional.

In addition to the above desirable features, workers in the art will recognize that it is often highly desirable that a bar code be able to be generated simply, such as with conventional printing apparatus or accurate code marking quickly and conveniently. Many prior art codes are too complex to permit this, requiring either a special extensive complex of print hammers, complicated selection logic, or both. Some schemes even resort to generating a single character pattern with a number of hammer strikes—a very risky practice inviting spacing and registration problems. The instant code has been devised to permit bar code printing conveniently using conventional high speed printer apparatus and allowing one hammer strike per four-bit-character, thus virtually eliminating inter-character variations in mark position. The novel code has virtually eliminated mark spacing wories since spacing variations can be ignored. Thus, another object of the invention is to provide a bar code that can be generated simply by conventional printer means, especially using a single hammer for printing an encoded character.

In the course of devising the novel code, it was realized that generating it with a conventional unmodified high-speed printer could result in character distortion. For instance, timing variations in the printer and variations in the type slug/paper contact (such as result from skewed elements, defaced slug characters, paper imperfections, etc.) can lead to "smearing," "ghosting" partial mark obliterations and other common print distortion. To detect the novel bar code despite this mark distortion, there has also been devised a novel decoding arrangement according to the invention.

More particularly, it will be recognized that vertical misalignment between a code pattern and the associated read-detector means may commonly result in reading errors. Such misalignment can commonly result from skewed document feeding, aberrations from the prescribed standard document size (skewed cutting etc.) and from the standard print mark size, or the like—none of which is uncommon in the art. The invention provides a sensing/decoding arrangement which besides its simplicity and adaptability to the above-mentioned code characteristics is also arranged to be "self-registering" and thereby tolerant of wide variations in mark/sensor alignment without loss of accuracy. Workers in the art, on the other hand, have characteristically approached this problem with relatively complex solutions such as complicated arrangements for detecting mark position, for scanning, for multiplying decoders, for aligning records, and the like. The invention avoids all of these cumbersome augmentations to a standard decoder arrangement—instead simplifying it markedly. Thus, it is a further object of the invention to provide an improved means, and associated methods, for accurately, but simply, interpreting bar code patterns without being affected by vertical or horizontal mis-registration; and especially without requiring means for ascertaining code or document position.

In summary, workers in the art will acknowledge that a novel encoding scheme, and associated decoding means, which is now much looked for, but as yet unavailable is one which possesses most preferably all the following characteristics; i.e. the "ideal" code should:

(1) Be easily written, e.g. using conventional high-speed printers relatively unchanged—preferably printing an entire character with a single hammer strike;

(2) Have at least 12 characters;

(3) Permit fields of random length;

(4) Be insensitive to common spacing/registration (relative to the decoder) irregularities;

(5) Be self-synchronizing for each character—as result of (4), (5) therefore be insensitive to variations in: clocking; transport speed, character or document position (skew), etc.;

(6) Be visually readable, permit rapid recovery despite noise, dropouts and be self-correcting;

(7) Be self-checking ("verify" information via di-bit);

(8) Be easy to decode, with simple reliable means; and (9) Be apt for returnable media (e.g. credit cards); and preferably readable bi-directionally.

It is an object of the invention to provide a novel bar code scheme exhibiting these "ideal" characteristics.

Another object is to provide bar code indicia upon documents adapted to be read by a stationary multi-transducer head wherein the detection thereof may be self-synchronizing, self-checking, self-locating and bi-lateral.

Another object is to provide such a code as well as self-registering interpreting means therefor.

Other objects and advantages will become apparent from the following description of a preferred embodiment of the invention as illustrated in the accompanying drawings.

According to the invention there is provided apparatus for sensing a vertical di-bit bar code pattern on a document, the apparatus including a plurality of sensing means arranged column-wise to bracket and intercept all likely transit paths taken by the code pattern image; and decoding means at the output of the sensing means and including buffer memory means adapted to store a prescribed number of successive outputs (comprising a character, or word) from said sensing means; code generating means adapted to generate binary pulses according to identical or non-identical successive sensing output patterns in said buffer means; register output memory means adapted to store a character-coded form of said sensor output patterns for application to utilization means; and complementing means arranged to selectively complement the code in said register means in response to a prescribed intra-character shift in said sensor output pattern at a prescribed intra-character time.

In the drawings wherein like reference numerals denote like elements:

Figure 6:
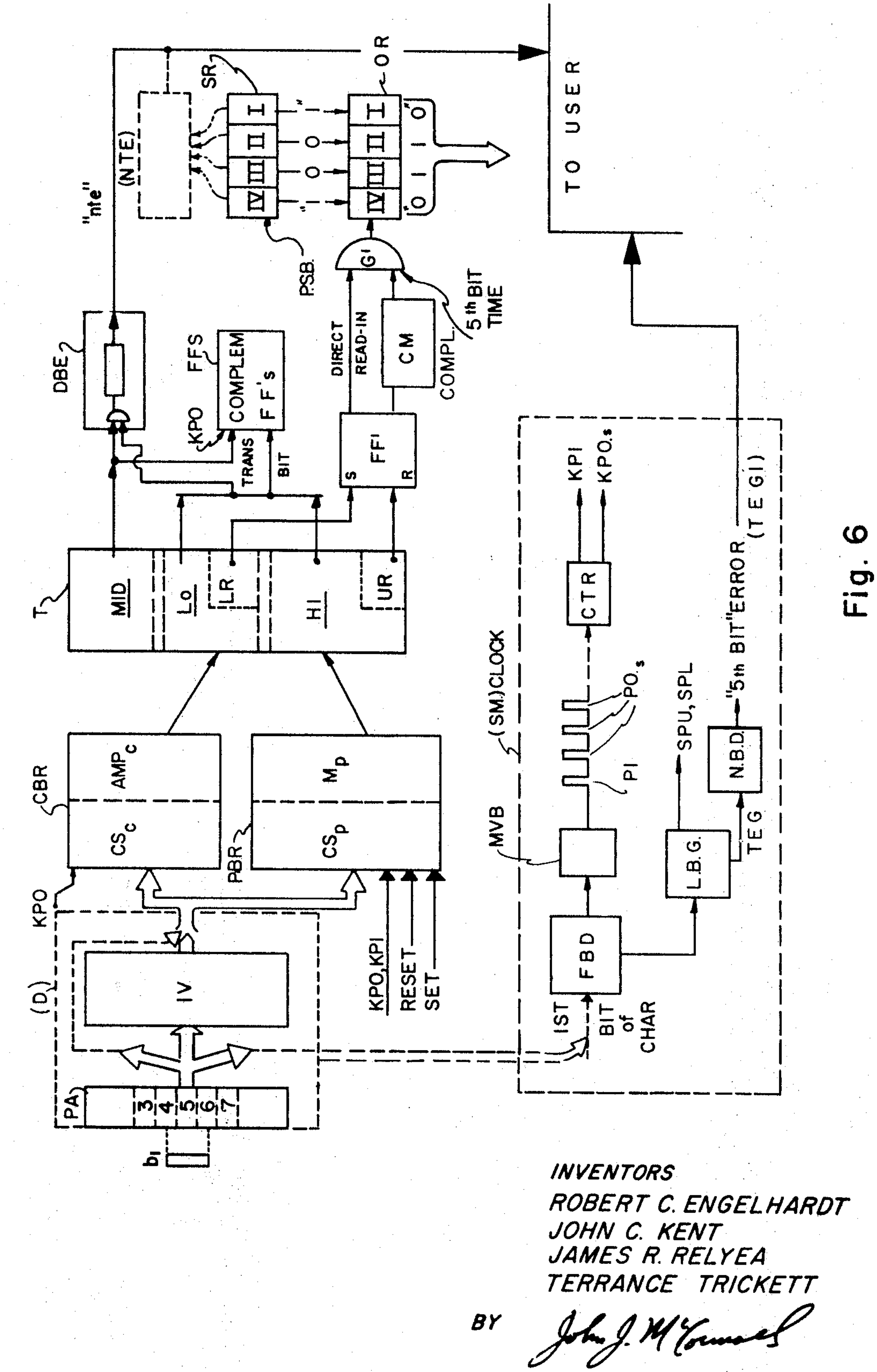
FIG. 6 is a more detailed block diagram illustrating a preferred implementation of the arrangement in FIG. 5.
Figure 7A:
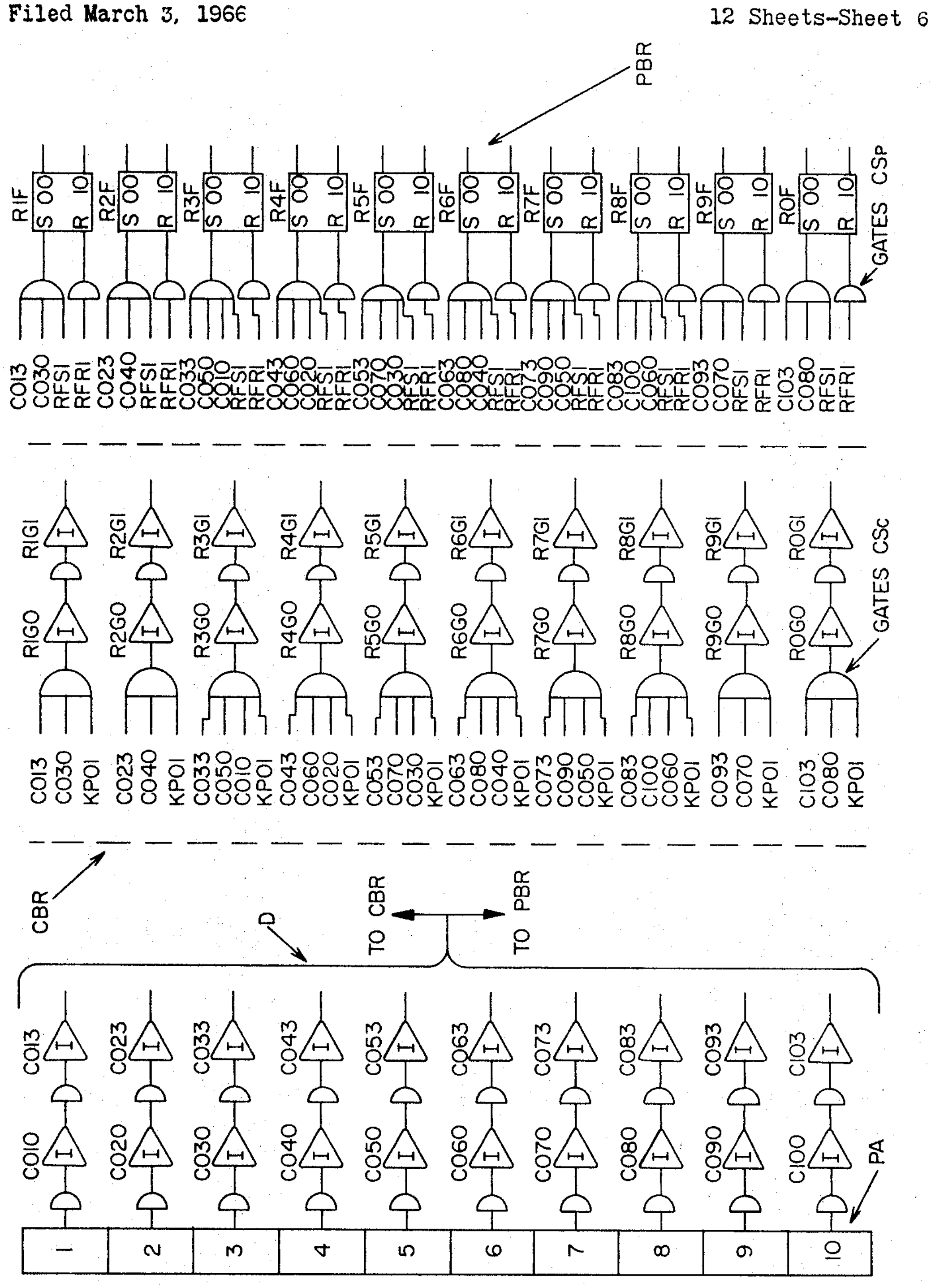
Figure 7B:
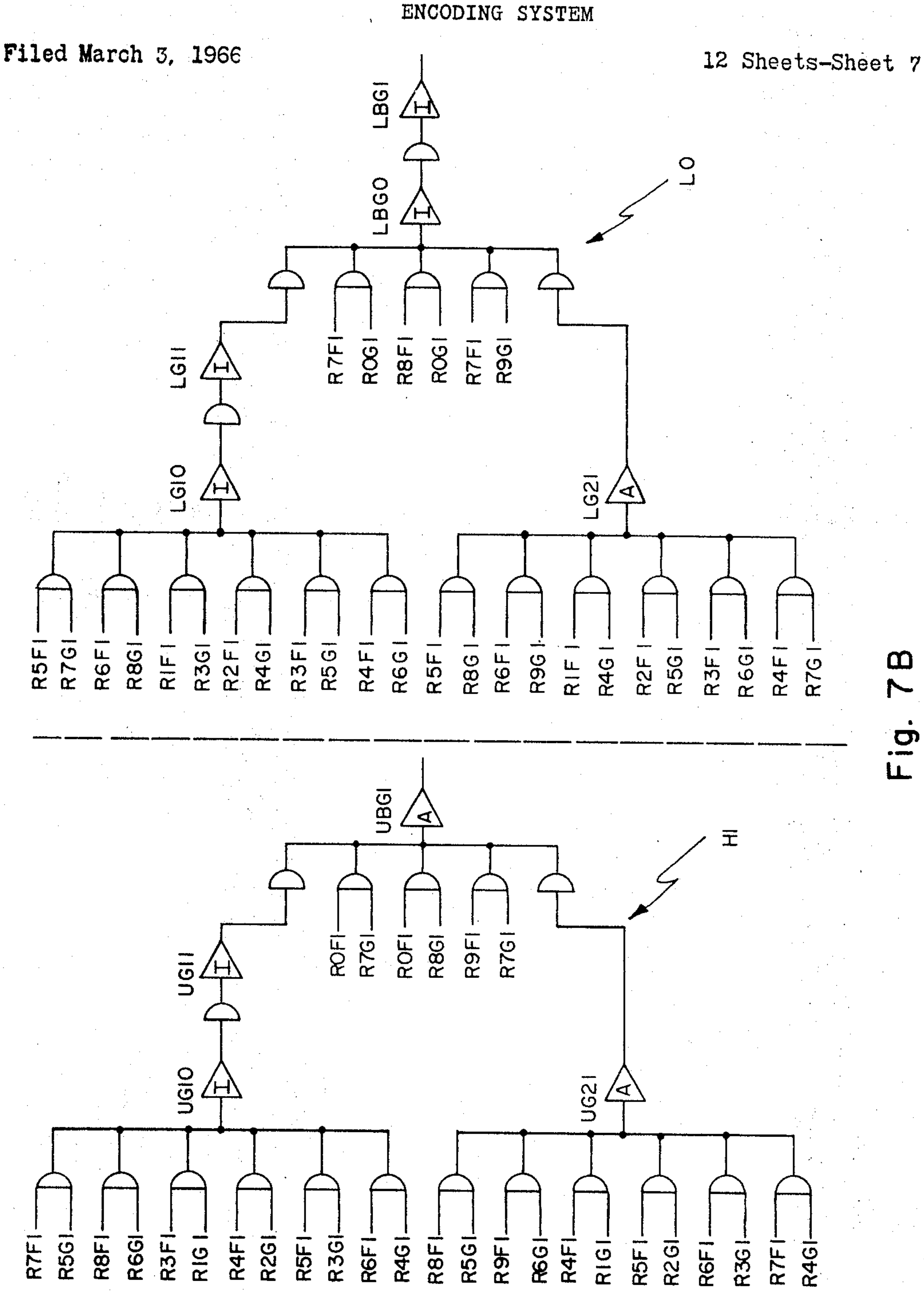
Figure 7C:
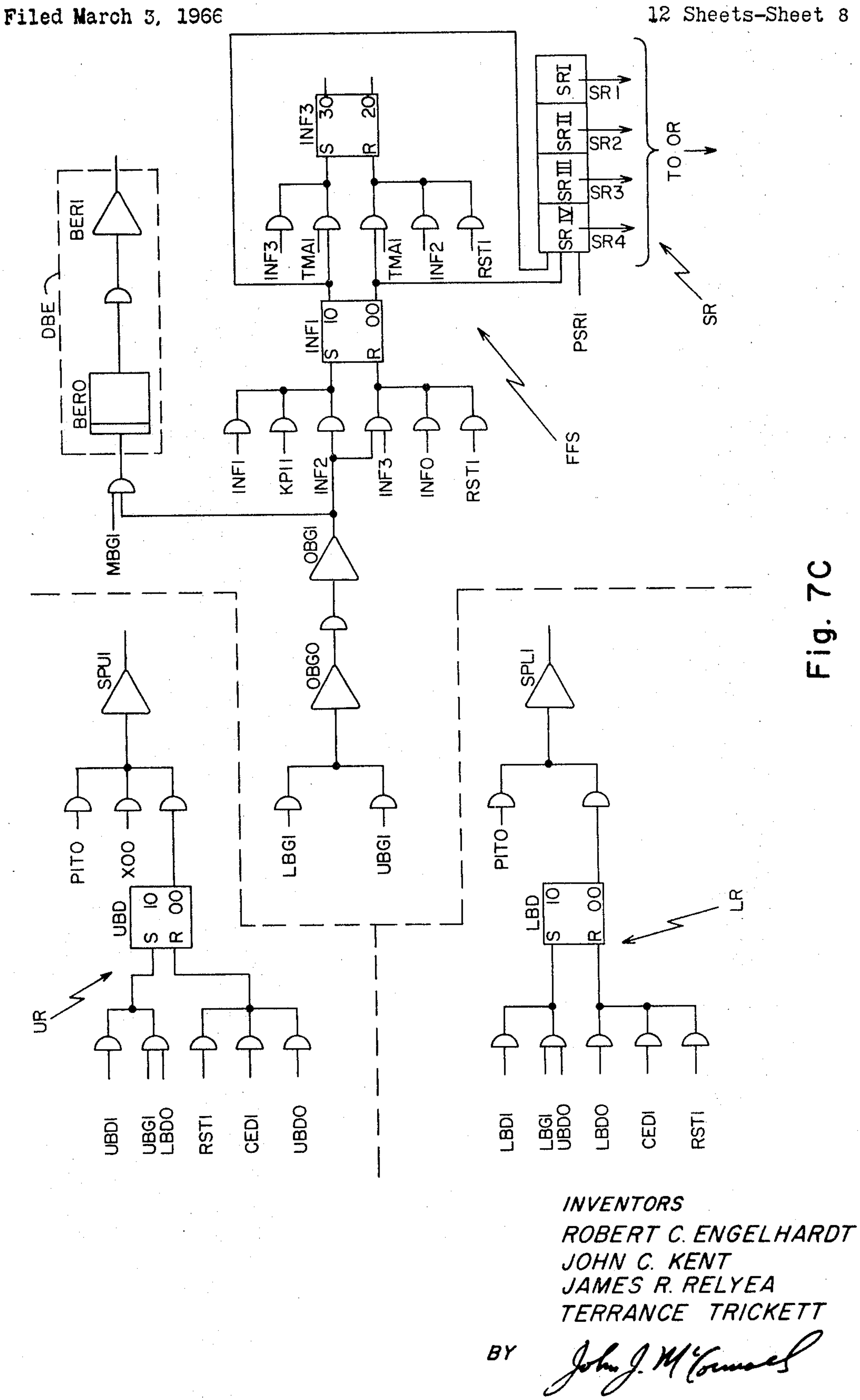
Figure 7D:
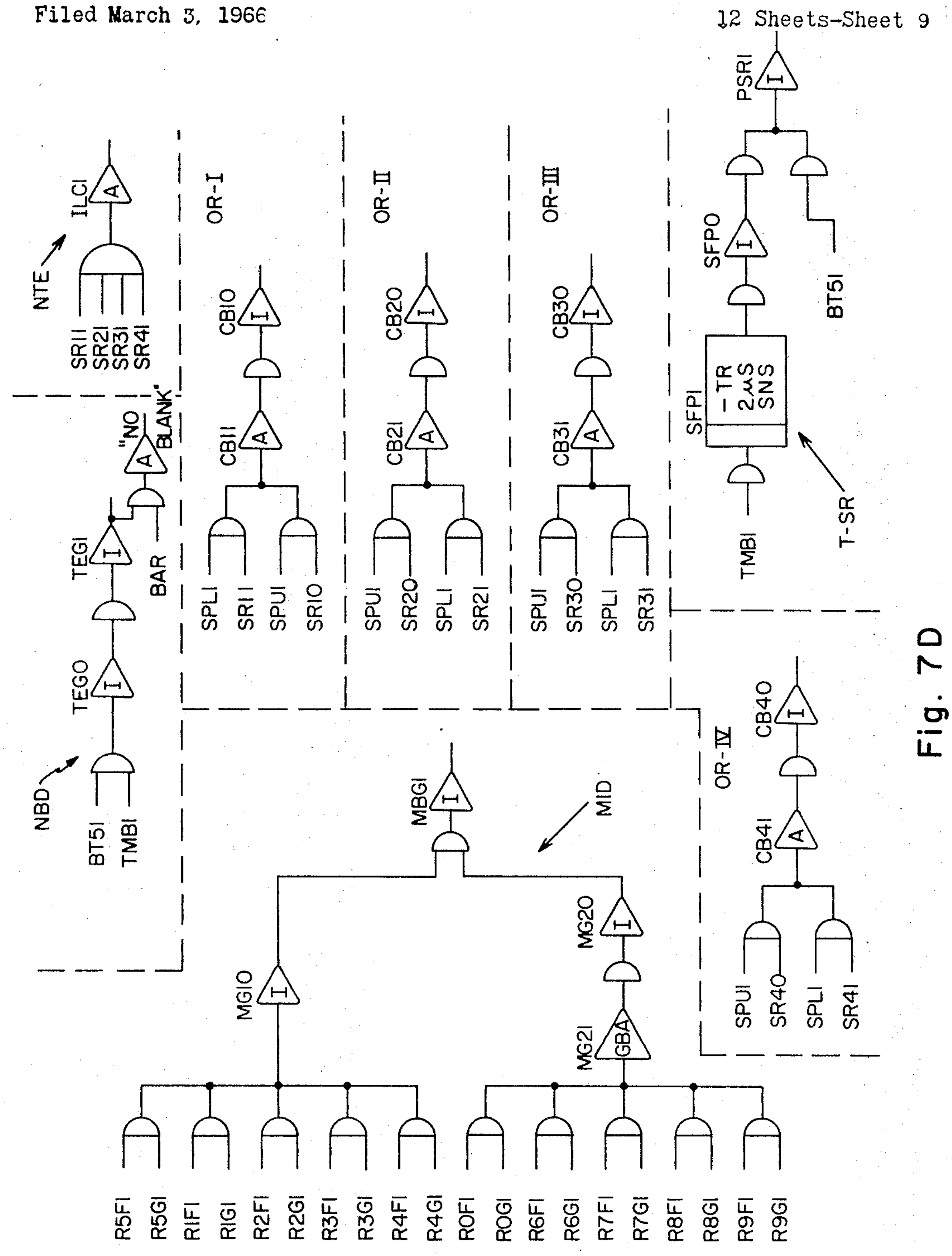
Figure 8:
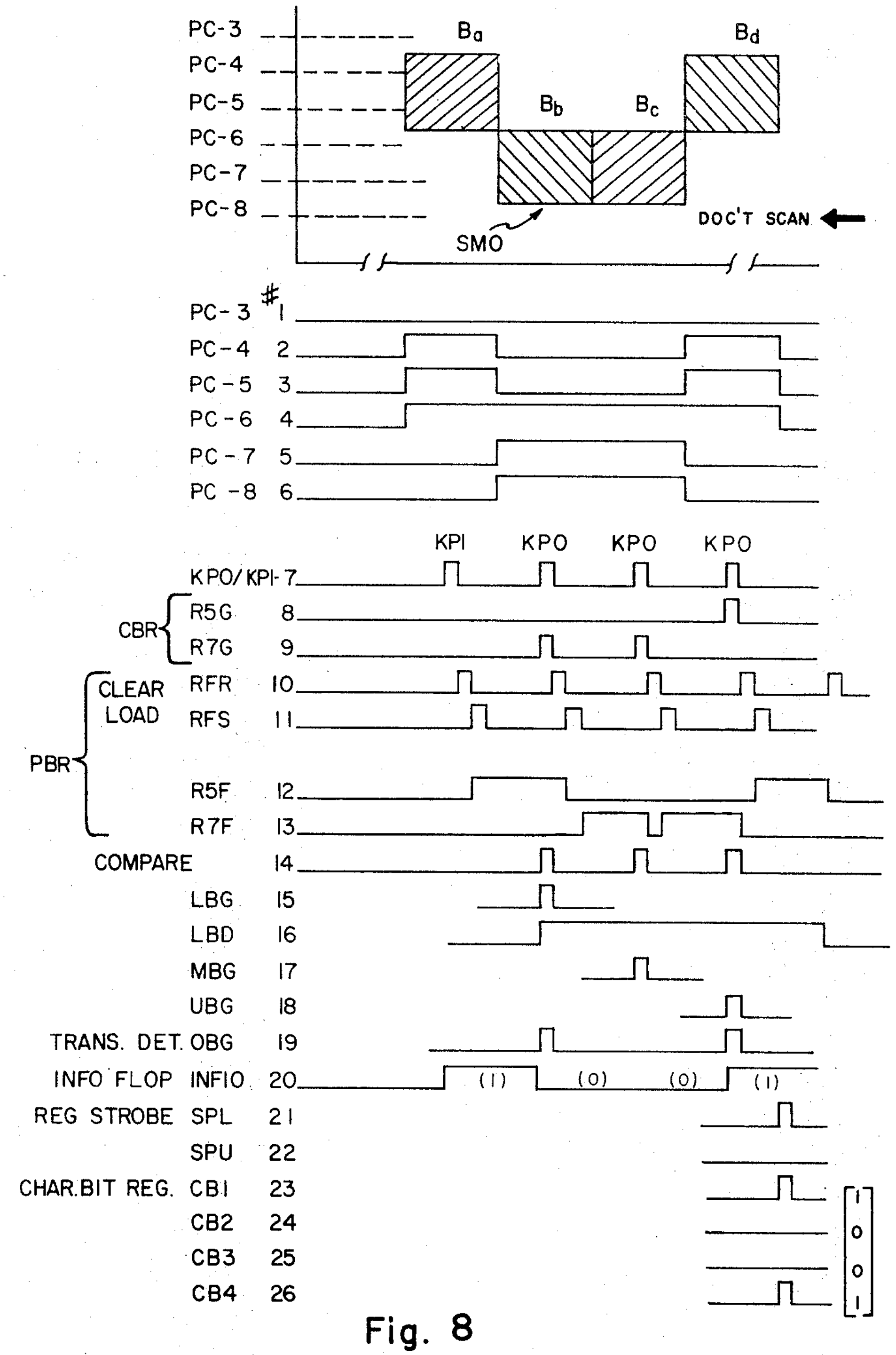

FIGS. *7a–7d* comprise detailed logic diagrams of the decoding arrangement in FIG. 6;

FIG. 8 is a timing diagram illustrating in exemplary fashion the operation of various elements in FIG. 6 and 7 as related to the detection of a typical bar-encoded character pattern according to the invention.

Figure 5:
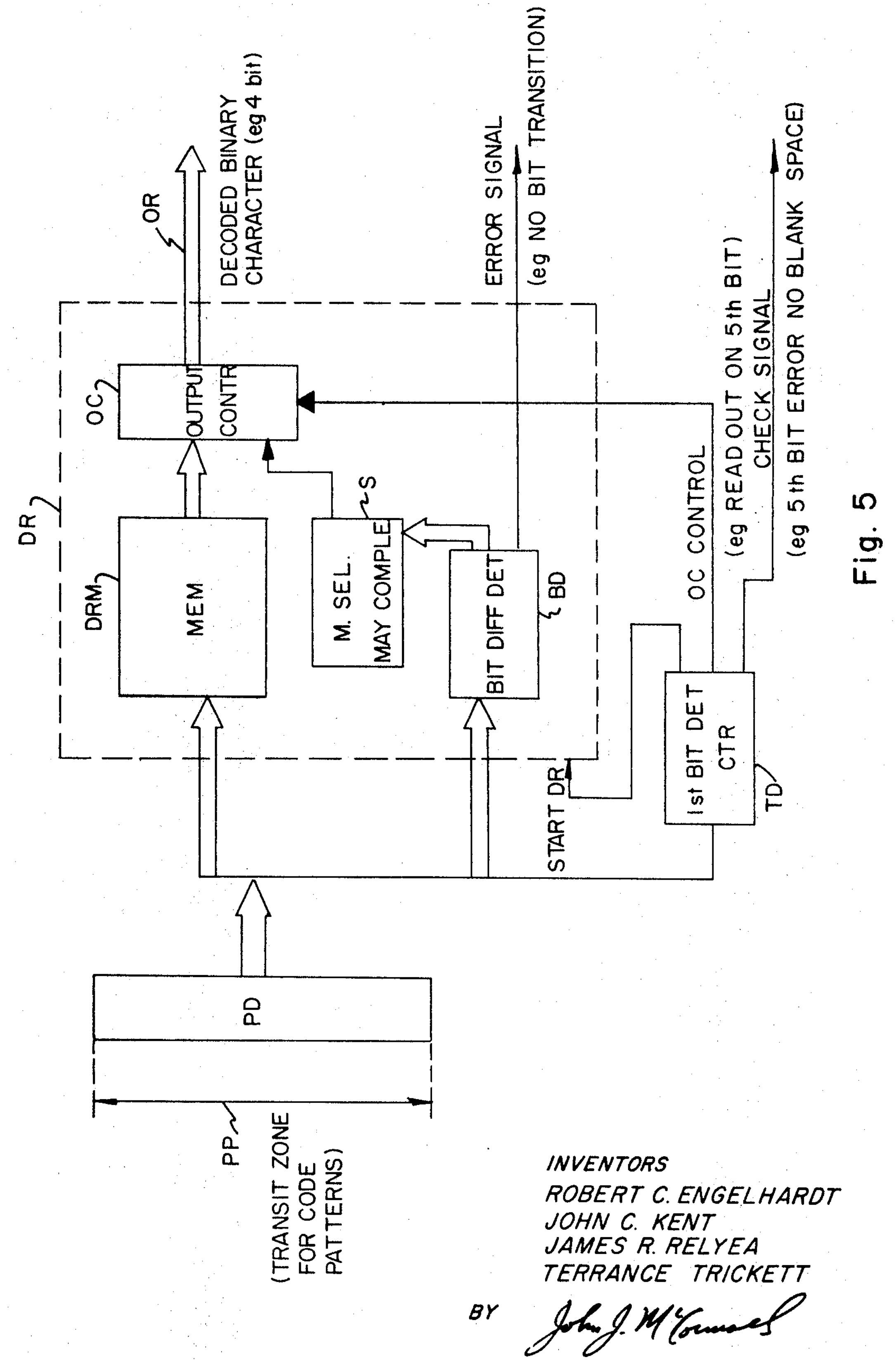
FIG. 5 illustrates a generalized schematic logic diagram of a "self-registering" decoding arrangement adapted for the code indicated in FIGS. 1 through 4 according to the invention.
Figure 9:
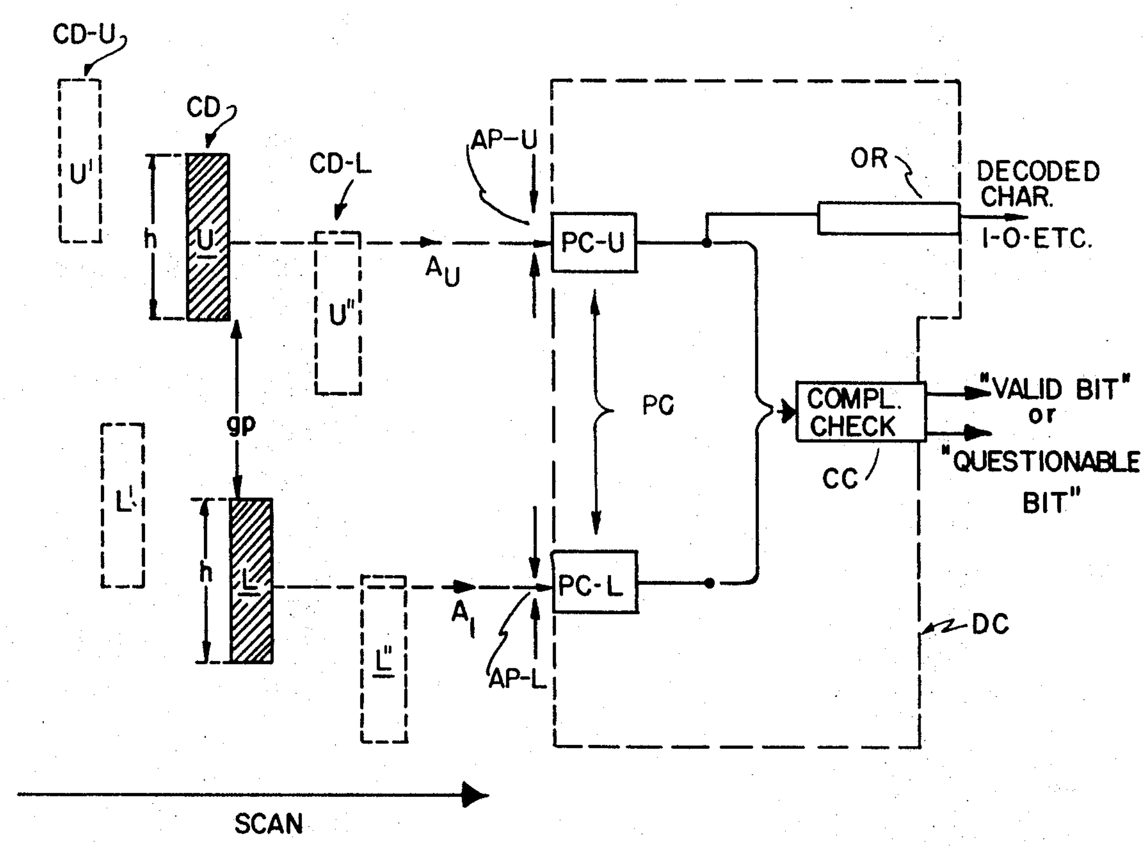
Figure 10:
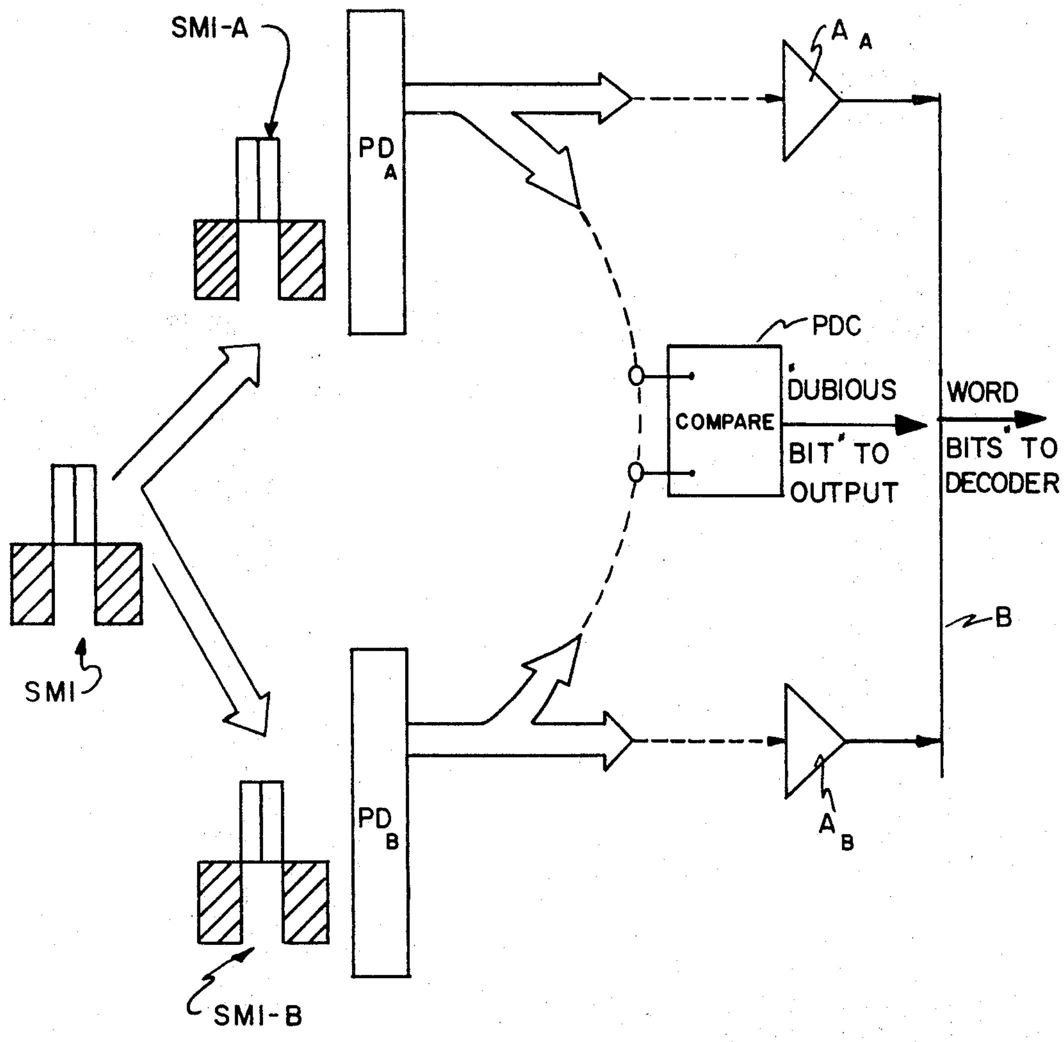

FIG. 9 schematically indicates a modified bar code word pattern together with positionally-related detector means and associated modified decoding means for use with the arrangements of FIGS. 5 and 6; and FIG. 10 indicates a modified bar character image and related detectors therefor together with logic elements for performing a "dual threshold" type modified detection for use with the decoding arrangements in FIGS. 5 and 6.

Figure 1:
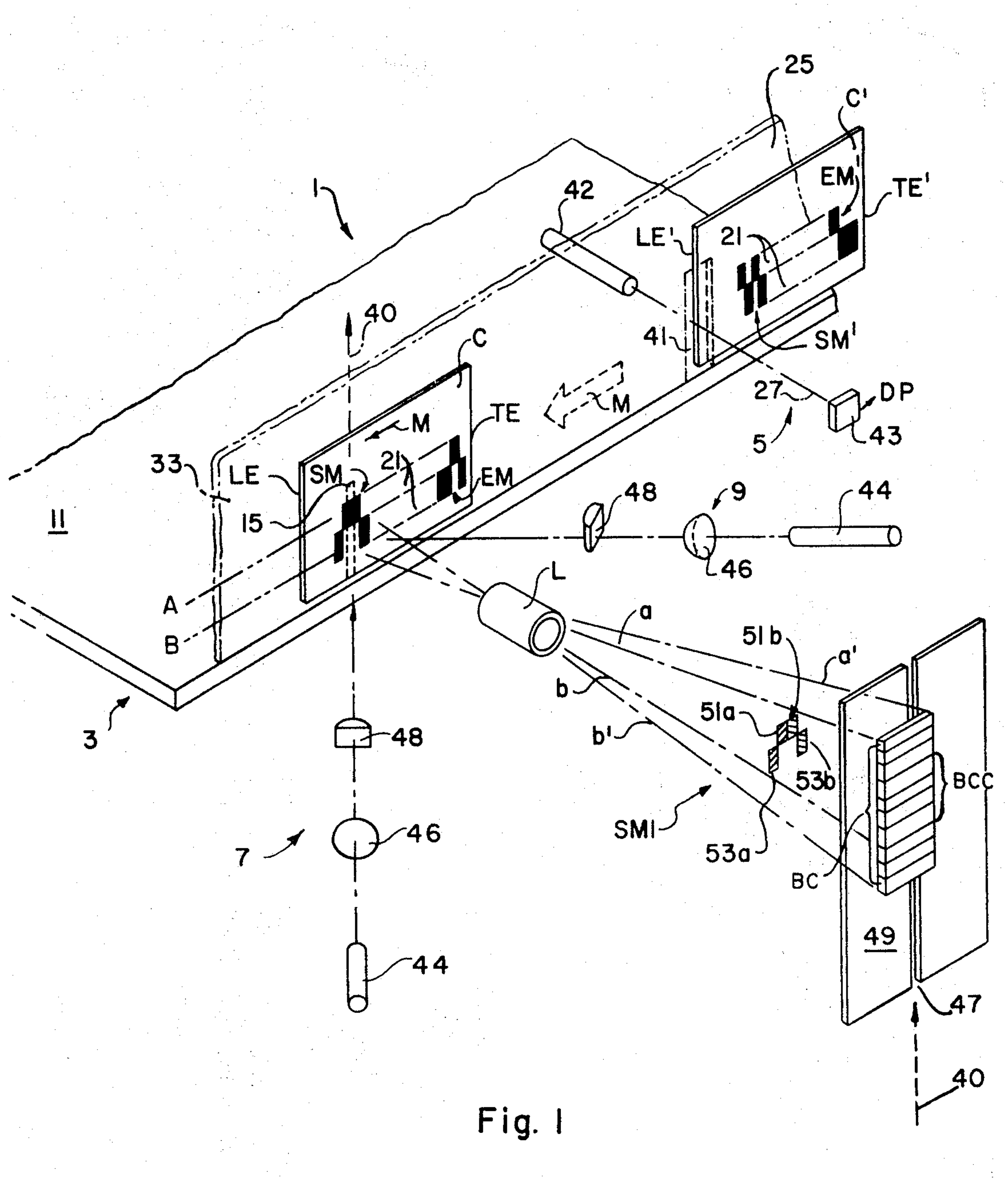
FIG. 1 is an idealized perspective of a read station for interpreting documents which are bar-encoded, according to the invention.

With reference now to the drawings, a bar code sensing station 1 is illustrated schematically in FIG. 1 which generally indicates an array BC of sensing means (e.g. photocells) bracketing a prescribed read-zone (between axes *a′*, *b′*) for interpreting bar code image patterns according to the invention. For instance, registered cells BCC can sense (sequentially) the bar bits comprising bar characters (e.g. SM, SM′, EM, EM′) on documents (e.g. cards C, C′) as they are transported in a prescribed manner past a prescribed reading zone (15); these marks (e.g. image SMI) being imaged upon cells BCC in the zone between axes *a*, *b*. This optical bar code reader arrangement is merely illustrative of the type suited for use with the novel bar encoding scheme, according to the invention, the sensor means for such an arrangement being detailed below relative to the description of FIGS. 2, 3 and 4; decoding means being detailed in describing FIGS. 5–10. It will be understood that station 1 includes a document transport means (not shown) for translating documents (C, C′ etc.) successively along a reference surface 11 in a prescribed transport direction (M) to be sensed by photocell array BC. As will be seen below, it is a feature of the invention that the decoding arrangement associated with transducers BC is self-synchronizing and can tolerate variations in transport speeds; some such variations being inherent in virtually every transport device. Unless a decoding arrangement is so self-synchronizing from character-to-character relatively minor changes in transport speed and destroy reading accuracy.

The general opto-mechanical operation of this optical reader arrangement whereby it senses bar code marks, is conventional, as will be apparent to those skilled in the art. For example, deck 11 is arranged to carry a guide plate 33 having reading aperture 15 cut therein to define a prescribed reading zone past which documents C are driven. Aperture 15 is equivalent to cell mask 49, and is illuminated by a pair of conventional lighting arrangements, comprising lamps 44 and lens means 46, 48 to direct illumination detectable by cells BC theretoward. This illumination generates bar-code reflection images of each bit (e.g. bit 51*a* shown imaged) in a character pattern (e.g. SM) sequentially, being magnified by a conventional lens arrangement L and focused thereby upon certain cells in bank BC (image SMI shown typically focused between axes *a*, *b* upon four center cells B4–B7 in subset BCC). Thus, images of successive bar code patterns are projected, column-by-column, onto prescribed ones of the cells in bank BC. The frequency and intensity of the light from lamps 44 is adjusted so that the photocells in bank BC are suitably responsive to reflections from the bar code marks, these marks preferably comprising black printing on white stock, but comprising any indicia whose presence on a document is perceptible to the read-sensors. Photocell bank BC is arranged behind a masking plate 49 including a slit 47 to establish a common aperture, along bar-column axis 40, extending across all the photocells; this aperture having a prescribed width (less than about one imaged-bar width). Thus, the photocells in bank BC will read along successive columnar portions of a document to sense the images of one or more bars in each of the columns at successive strobe times. The imaged cells (BBC) will thus provide bar-indicating signals for each marked column self-locatingly and self-synchronously, to thereby sense and transduce character patterns (SM) on documents (C) as they are transported past aperture 15.

Conventional transport means are prone to uncontrollably shift the vertical position of documents as they translate them (transport jitter and document skew). Thus, one must expect some vertical shifting by documents C, C′ and thus, variations in the position of the bar images along axis 40, such as to shift registration thereof between different groups of imaged cells BCC; at times, on successive documents and at times, along a single document. Various other common causes may also induce vertical mis-registration, such as bar code printing misalignment, distorted printing and off-axis document cutting, (e.g. the bottom edge of document C being rough, jagged) and similar (character skew) displacement of a bar mark from registration along reference axes (A, B, upper and lower axes) of the reader 1, causing different imaged cells (BCC) to go active. Cell bank BC is therefore extended (between axes *a*′, *b*′) to bracket all likely image-transit paths. While prior art bar code arrangements and associated interpreting means are characteristically upset by such vertical shifts in mark/transducer registration, the bar code pattern according to the invention, being self-locating and self-strobing, minimizes such problems; further, the preferred decoding means, according to the invention is insensitive to them, as detailed below.

In some cases, reading station 1 may preferably include an injection station 5, whereat the injection of a document (such as C′) is signaled to the reading system. For instance, one may provide an aligning mask 25 having a window 41 therethrough together with a lamp 42 and an associated photodetector 43, in registry with one another through window 41. Detector 43 is arranged to provide a "document presence signal" (DP) when the leading edge (LE′) of a document is interposed across window 41. Thus, as each individual document is transported through reading station 1, the approach thereof may first cause a document inject signal DP to be applied to the read control means, the document being continually transported therepast for bar sensing at read aperture 15. A like arrangement may provide "document exit" signals.

Figure 2:
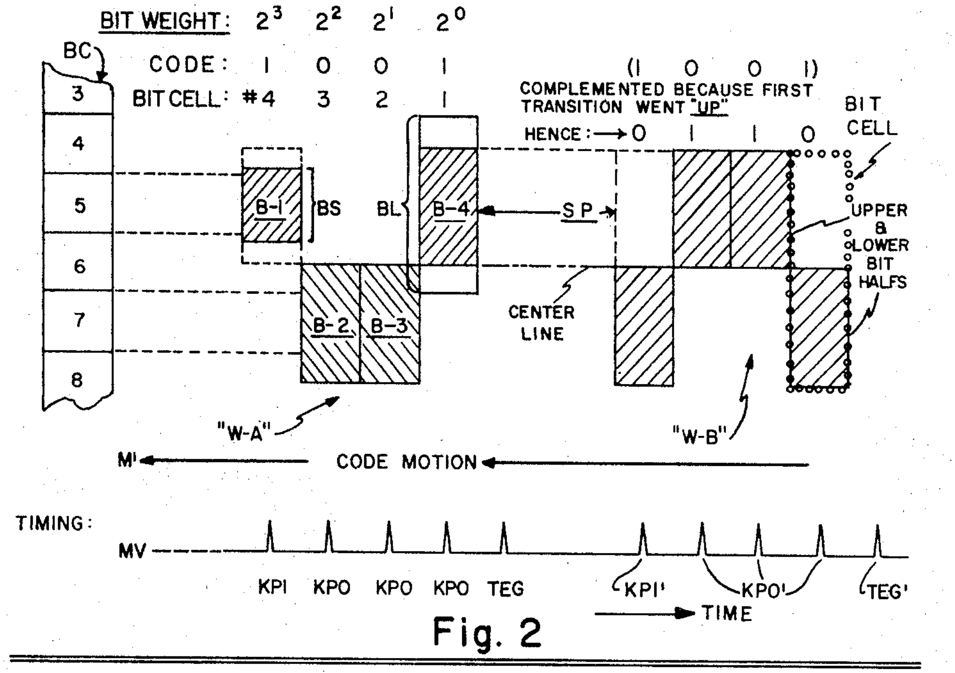
FIG. 2 shows a pair of typical bar code character patterns according to the invention, the positional relation thereof being indicated relative some of the detector cells of FIG. 1, the time sequence of each mark in said patterns past said cells also being indicated.

Characters are encoded, according to the invention with bar code patterns, exemplified by character patterns EM, EM′, SM, SM′ as indicated below for FIGS. 2, 3 and 4. The upper portions of the bar code (cf. bar images 51) are normally centered along upper track axis A (of mask 33); while the lower portions (cf. bar images 53) normally lie along lower track axis B, parallel to A. All the bars (i.e. bit marks) in a character (normally four) lie adjacent horizontally (and vertically also, if desired) and are separated by an inter-character spacing SP, as indicated in FIG. 2. It will become apparent to those skilled in the art that a feature of the invention is that the image SMI of he bar-encoded characters may shift in vertical position (along column axis 40) or in lateral position (that is, along transport direction M), and thereby image (and energize) different groups of cells BCC without upsetting the interpreting logic. Unlike known reading means, the bar code reading logic arrangement of the invention may be totally free of means for determining code position.

BAR CODE

Figure 3:
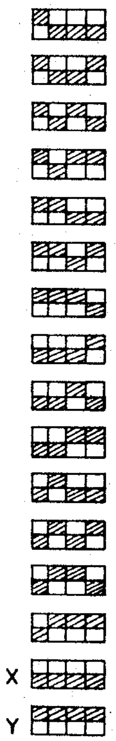
FIG. 3 shows a set of 14 printed characters which have been validly bar-encoded according to the invention; also indicating a complement-decoding of certain one thereof according to the invention.
Figure 4:
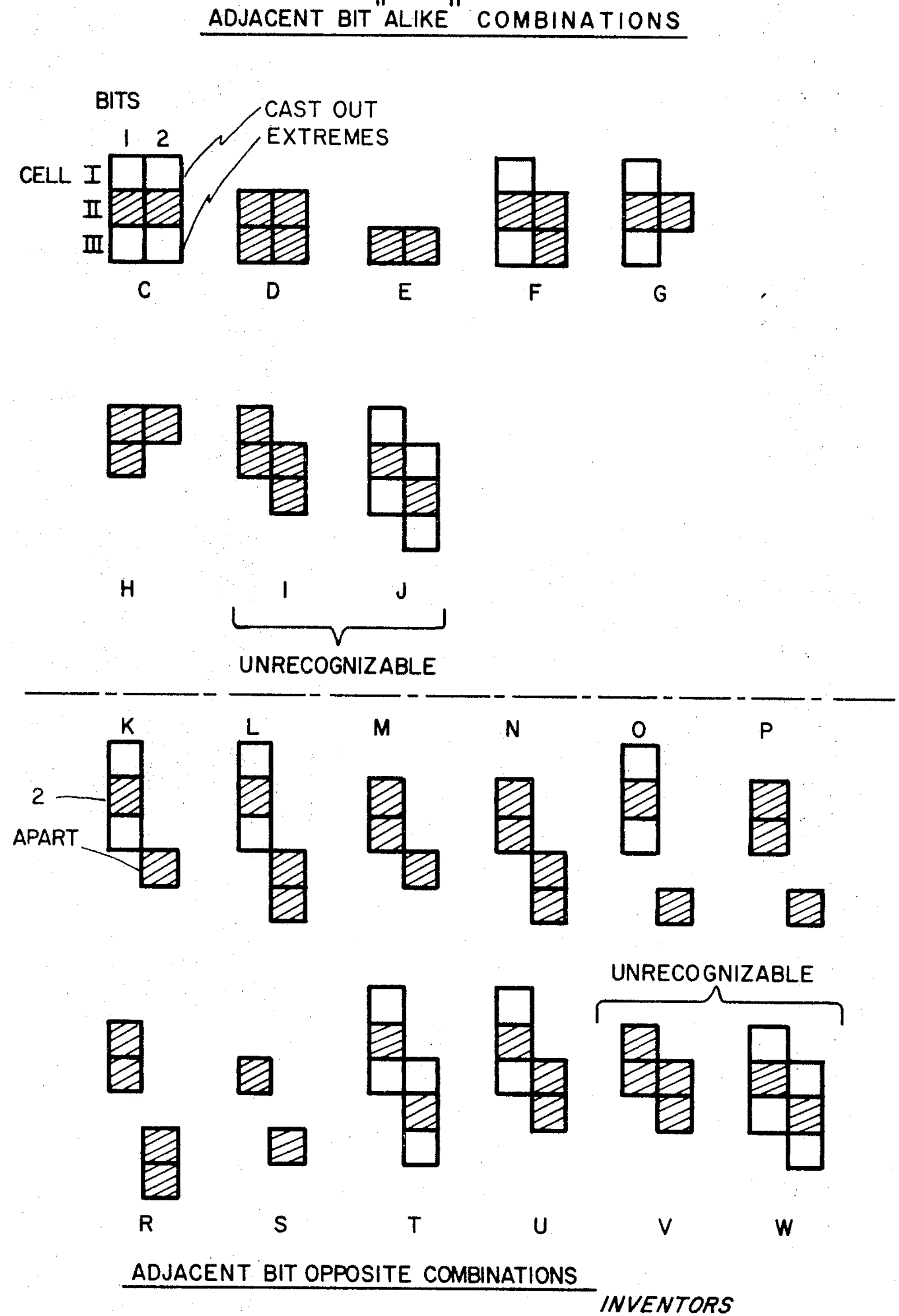
FIG. 4 is a very schematic array of some "active" detector cells, arranged to define "alike" and "opposite" bit-transition patterns, and also "center-cell selection," according to the invention.

The characteristics of a bar code according to the invention are best indicated by the exemplary code patterns in FIGS. 2, 3 and 4. FIG. 2 indicates the general characteristics of the code, showing very schematically, a section of photo-transducer bank BC and, optically registered therewith, a pair of bar code character images "W–A," "W–B." Image patterns "W–A," "W–B" will be understood as moving (along direction M′) past the imaged photocells $B_4$–$B_8$ in bank BC, with successive read-gating strobe signals (KPI etc.) being provided along (axis MV) to indicate the time relation thereof. As aforesaid, each character preferably comprises four vertical di-bits (see bars B–1, B–2, B–3, B–4 of character "W–A"); this four-bar pattern preferably being formed by a single print hammer (cf. FIG. 3). A space SP will be kept between successive bar-encoded characters so as to permit re-synchronization of the decoding means, as indicated below.

It is important that the dimensions of the printed bits B–1 etc. be controlled somewhat between limits. Thus, bits B–1 etc. should be of a relatively uniform width (i.e. along direction M′) since, as indicated below, detection of the first character-bit (pulse KPI) may preferably initiate following strobe pulses (KPO) for the following three bits, such as by starting multi-vibrator pulsing means which generates a prescribed number of pulses of uniform duration, as indicated below. This is illustrated along pulse train MV where "initial" strobe pulses KPI, KPI′ are provided for each character and are followed by three later "other" strobe pulses KPO, KPO′ (derived therefrom) at prescribed times. Similarly, fifth, or "terminal," pulses TEG, TEG′ may be derived for spacing-check and the like. Thus, if the width of bar bits B–1, etc. is kept fairly uniform, the multivibrator means used to generate following strobe pulses KPO may be adjusted accordingly to thus provide simple, convenient, yet highly accurate "self-strobing." Of course, document transport speed must be kept fairly uniform, but it is no longer critical. This self-strobing may be initiated for each character upon detection of each initial bit.

Though bar height may vary, it should be kept fairly uniform relative to the "aperture height" of the photocells ($B_5$, etc.) in bank BC. Thus, while the invention advantageously permits the printing of bars B–1, etc. with standard printing equipment, it will be evident to those skilled in the art that, for various reasons, bar marks may be so printed as to be "clipped" and the like, as is indicated at foreshortening spaces BS (in character "W–A"); or conversely, they may be lengthened or smeared (up to 1⅓ times normal height can be tolerated) as indicated by elongated portion BL. Thus, a constraint of the bar code is that height must be at least that providing an image height substantially that of the sensor aperture (indicated by the dotted lines through bits B–1, B–2); preferably more (up to three sensor aperture heights) to compensate for likely clipping; and should be no more than that necessary to provide full character sensing, despite likely smearing; preferably being optimized around a two-sensor height, such as indicated for bits B–2, B–3. A slight vertical gap between adjacent bits (e.g. B–1—B–2) can be tolerated also, as later described for the modified code in FIG. 9.

Besides the described features of the invention whereby the above-indicated vertical di-bit bar code patterns are arranged to be self-strobing and self-synchronizing, being dimensioned as indicated above and permitting no horizontal blanks within a character pattern, they provide character arrays which are bi-lateral and of random field length. As indicated before, an "open-ended" character array may be provided, being as long as one desires (random field length) and still be readable backwards (bilateral code) that is to be read in reverse without loss of interpretation accuracy or loss of the self-strobing characteristic. By thus providing freedom from independent strobe clocking means, independent strobe markings and the like, the versatility of the bar code and associated interpreting means is greatly extended.

As indicated in detail hereinafter, it is a feature of the invention that the bar code characters are very simply interpreted by initially interpreting every first bar pattern (e.g. B–1) as a binary "one," and thereafter designating successive bar patterns (within a character) as binary "ones" if they are "like" the initial pattern and "zeros" if they are "unlike" it (i.e. constitute a shift in the active photosensor pattern). Successive columnar bit patterns will thus either constitute "bit-transitions," i.e. a shift upward or downward to energize different photocells (being "unlike" bits); or will be "alike," producing no "bit transition," this being graphically illustrated in FIG. 4.

For example, in character W–A, initial bit B–1 is arbitrarily designated a "one," while B–2 is designated a "zero." This change in binary designation from that of prior bit B–1 reflects the occurrence of a "bit-transition," i.e., a shift (down) in "active" photocells at mark B–2, from cell 5 to cells 6 and 7, here. Similarly, bit B–3 is designated a binary zero, the binary designation being unchanged where no "bit-transition" occurs from mark B–2 to B–3 (same cells active). Finally, bit B–4 is designated a binary "one" since it constitutes a bit-transition (upwardly) from prior bit B–3. In a similar manner, the succeeding character image (character "W–B;" the code complement of character "W–A" incidentally) is, initially, read out as binary: 1–0–0–1 (later being complemented to "0–1–1–0," as below).

According to another feature of the invention, detailed below, this raw binary character readout is complemented (inverted), selectively, according to the direction of bit-transition; for instance, inverting the readout only if the first bit-transition is upward. For the arrangement in FIG. 2, it will be assumed that the decoding means is arranged to complement character codes only when the initial bit-transition is upward. Therefore, in the case of bar code character "W–B" the raw binary character output (shown in parentheses) will be complemented, as indicated; whereas the "W–A" output will not, since the initial bit-transition thereof was downward.

Another constraint imposed upon the above-indicated bar code patterns are that at least one of these "bit-transitions" must occur in every valid character. This and other code constraints are summarized below in Table I and are further indicated in both the exemplary "valid character" patterns of FIG. 3 and the various like/unlike "active detector" patterns of FIG. 4. Each box in the detector pattern (C thru W) in FIG. 4 (further described below), will be recognized as indicating an active detector cell, successive states of adjacent cells being indicated in each group. Thus, vertically adjacent photosensors in each group will be understood as energized (detecting bar marks), the horizontal adjacency thereof denoting energization at the next bit time. The shaded boxes also illustrate a different, "center-selection" concept (described below) which is helpful in defining "bit-transition."

Thus, according to another feature of such a code, a logical arrangement may be easily provided for "trimming" or simplifying the photosensor output patterns by a "center select" technique, detailed below with respect to FIGS. 5, 6 and 7. That is, when *more than two* vertically-adjacent sensors are "active" (that is, "on," having detected a bar), sensor-select logic means can strip away (delete) the outputs of extreme, outboard sensors; leaving only the central sensor (or sensors) active, as constituting the "selected sensors." This center cell selection is functionally indicated in FIG. 4 by the shaded selected-sensor boxes for cases C, F, G, J, K, L, O, T and U (the blank, unshaded box indicating a sensor output that is so "stripped away"). As a corollary of this function, it will be seen that where only one or two vertically-adjacent cells are "active," the logic means cannot perform this stripping (there being no "center cell"), but instead will leave all cells "active" as "selected sensor outputs." This is functionally indicated in FIG. 4 for cases D, E, H, I, M, N, P, R and S. One or two cells will always be so selected. Examples "C–W" are not exhaustive, however, and understood to include reversals, mirror-images, and like modifications.

Thus, as stated, every valid character must have at least one bit-transition, from "like" to "unlike" bit-patterns, as is indicated for valid character patterns numbers 1–14 in FIG. 3. Patterns X and Y of FIG. 3, therefore, are invalid, exhibiting no bit-transition, but merely the detection of four "like" (horizontally adjacent) bar marks. The 14 valid characters of FIG. 3 may each represent a different type slug in a relatively conventional high-speed printer for easy, legible and reliable printing of characters, bar-encoded according to the invention. As will be seen below, such characters may also be detected quite easily and with high accuracy. To further illustrate the selective complementing feature, mentioned above, bar code characters 8 through 14 are indicated as having been complemented by the decoding means because the initial bit-transitions thereof were upward.

It will be appreciated that this bit-transition constraint advantageousnly makes the described bar code pattern, and associated detectors, self-locating, since every valid character pattern will have at least one upper and one lower mark, these marks being adaptable for position referencing where desired. For instance, if the bar code is printed along a straight line and the image thereof is unvaryingly detected, a reading system (as detailed below) may very easily locate the "center line" (see FIG. 2) of the encoded character, simply upon detecting a "bit-transition," since this will constitute the juncture between vertically-adjacent, successively-active photocells.

The creation of the indicated code is particularly convenient in forms like the four di-bit characters of FIG. 3 since they are printable with one hammer strike of a simple type slug, being employed so as to leave a blank space SP between successive characters. Inter-character space SP is entirely uncritical above a prescribed minimum and may be readily employed for "blank-checking," vertification of strobing and validity, etc., being activated simply by the expedient of providing a fifth strobing pulse TEG for each character, as indicated in FIG. 2.

TABLE I—CODE CONSTRAINTS

The above-indicated code constraints, according to the invention, as well as a few other, more selective, constraints may be tabulated as follows:

1. Di-bits

Each character is comprised of a number (e.g. four) of horizontally-adjacent, similar, vertical, di-bit bar marks, denoting a single bit per column; these bits being read out as (four) binary signals;

2. Center-stripped

Where only one or two vertically-adjacent photosensors are "active," all of the outputs thereof are fed in parallel to the decoding means;

However, where more than two are "active," center-cell select means will select only the central outputs as "selected outputs" for readout, discarding the other outputs (cf. FIG. 4, shaded sensors);

3. Bit-transition

The decoding register must indicate at least one bit-transition (one-to-zero or zero-to-one) for each character pattern; a bit-transition being defined as two adjacent "unlike" bits, that is, two bits which are not "alike," these terms being further defined below;

- - - *"Bit-transition" definend, as adjacent "unlike" bar patterns, i.e.:3–A* to be *"unlike"*:

(i) Adjacent bars must activate two different ones out of three adjacent photosensors; examples of such unlike bar patterns (as detected by "active" sensors) are indicated in FIG. 4, cases K–U; cases C–H being thus characterized as "alike" since they do not fill this requirement;

(ii) And have no "common" selected-outputs, that is, have no "selected sensor" the same for two adjacent bits - - (this would indicate "alike" bits);

(iii) And also have successive "selected-sensors" one or two vertical positions apart (readily discernible in cases K, L, O, P, R, S, T - - while cases M, N and U also satisfy this, it being understood that there can be "selected sensors" intermediate the "spaced" sensors).

(*3–B*) Conversely, adjacent bits are *"alike"* (no bit-transition) if:

(iv) The above conditions i, ii or iii do not apply (it being required, for instance, that there be at least one "common" pair of selected outputs);

(v) Or there is no more than one case where "selected sensors" are mis-matched (i.e. are not common).

- - - *Errors:* The following code patterns are *"unreadable"*:

(A) In any one single character (four bars) there is no bit-transition (cases X, Y FIG. 3); or excessive (more than one space) transitions ("up-up" or "down-down");

(B) For adjacent bits, there are neither (1) any common "selected sensor(s)" nor (2) any "spaced sensors," as indicated above (3B–v and 3A–iii);

(C) There is no common output (active for adjacent bits) nor any active pair spaced one or two positions apart - - - outside "alike" and "unlike" definitions; may be neither or both therefor.

(D) Miscellaneous erroneous bar marks (e.g. too small, too large, etc.).

CODE VARIANTS, DECODING MODE

Shown in FIG. 9 is a bar code character pattern CD somewhat modified from that shown in FIG. 2, as well as an associated decoding means, illustrating both the versatility and other advantageous features of the encoding scheme according to the invention. FIG. 9 is also used to further explain code feature, as such how it may be read by a simplified sensing-decoding arrangement very schematically indicated at DC, including a pair of photosenor units PC. Decoder DC especially illustrates various size and spacing relations between the code bars of the invention and the associated sensing means. More particularly, character code CD includes two vertical di-bit (bar) impressions (not four as in FIG. 2), namely upper bar U and lower bar L, separated vertically by a prescribed gap "*gp*," bars U, L, having a prescribed uniform height "*h*" and width. Also shown (in phantom) are an upwardly displaced version of character CD, namely pattern CD-U comprising upper and lower bars U′, L′, respectively; and a downwardly displaced version CD–L comprising upper and lower bars U″, L″. A pair of phototransducer means or like bar detectors, PC are provided for sensing these bar impressions along prescribed detect axes, namely upper and lower photocell means PC–U, PC–L respectively arranged along upper and lower detect axes $A_u$, $A_l$. Upper sensor PC–U, located along upper detect axis $A_u$ roughly midway along upper bar U, has an aperture AP–U of a prescribed height; while lower sensor PC–L, similarly registered along lower detect axis $A_l$, has a prescribed aperture height AP–L. As will be more apparent hereinafter, decoder DC also includes an output register OR, having two memory locations for the two bits in bar characters CD etc. and, arranged at the output of upper sensor PC–U. Register OR is adapted to store the output signals from PC–U in the form of binary character-indicating signals, the binary sense of which may be arranged to depend simply on whether or not a black mark was detected by PC–U. Additionally, a complement checking means CC is provided to receive, in parallel, the outputs from sensors PC–U, PC–L and, responsively, determine whether or not they agree, that is, whether one is the complement of the other, as each di-bit should be. More particularly, as recognized by those skilled in the art, complementing stage CC may be adapted to provide "code-validity-check" information, such as either a "validity" check bit signal, indicating complementariness, or alternatively, a "questionable bit" signal indicating non-complementary (conflicting) detector outputs. Thus, the inventive code scheme permits vastly simplified decoding logic for reading bar-encoded patterns with a surprisingly high degree of accuracy.

It will appear that the height of the bars U, L, etc., relative to the height of photosensors AP–U, AP–L, is somewhat important. Since, for convenience, bar imprinting is preferred, the minimum bar height possible will often be limited by practical considerations. For instance, high-speed printers, typewriters, mechanical calculators and the like cannot conveniently print detectible characters smaller than about 100 to 125 mils (thousands of an inch—character height includes height of both bars plus intermediate gap "*gp*" if any exists). Some special purpose machine, however, such as specialized high-speed printers can print smaller characters and this will be preferred for data compaction. The width of bars U, L, etc. will be as small as is consistent with good print quality and sensor resolving powers. In the case of bar-impressions on plastic documents (such as credit cards, etc.) a vertical inter-bit gap "*gp*" is a practical necessity. For such documents, height *h* will commonly be about 100 mils or less with a gap "*gp*" of about 50–60 mils in height.

Those skilled in the art will appreciate that bar code recognition is plagued by problems of jitter and skew whereby the vertical location of one or both vertical di-bit bar images may vary relative to the vertical location of the detecting means (i.e. to detect axes $A_u$, $A_l$). This is commonly caused by deviations in the document transport and/or aligning means or in the bar-imprinting means (whereby the size of the bars and their placement on the record may vary) and the like, as stated. For instance, using a standard high-speed printer, a variance in bar height of as much as 10–20% (for 100 mil bar) must commonly be tolerated. Therefore, one way may expect such displacements to occur on the order of a maximum of about 30 to 50 mils, overall, for the indicated arrangements.

The bar code and associated detecting means according to the present invention are adapted to accommodate such displacements without significant errors resulting therefrom. For instance, in the bank of cells BC in FIG. 2, ten cells, having an effective aperture of 25 mils each, will thus bracket a document code zone about 250 mils high. For such a case, bar displacements of up to 150 mils (i.e. 1½ character heights for characters "W–A," "W–B" in FIG. 2) may be tolerated, where the bars (B–1 etc.) are 50 mils high. It may readily be seen that the minimum bar height "*h*" for bars U, L in FIG. 9 will be equal to the cell aperture height (AP–U) plus twice the maximum bar displacement. Thus, for an aperture height of 25 mils and a maximum displacement of 40 mils, bar height "*h*" should be a minimum of about 105 mils. Further, it will be apparent that for such conditions with code CD taken as occupying a standard reference position relative to sensors PC, misplaced characters C–D–U, CD–L cannot wander more than 40 mils from this reference position without compromising detecting accuracy.

DECODING, GENERALLY

Novel means for detecting and decoding the above-indicated bar code character patterns according to the invention is indicated very generally in the block diagram of FIG. 5, details of a preferred embodiment thereof of being more particularly shown in FIG. 6 which is, in turn, further particularized in FIGS. 7A–7D, while an exemplary operation thereof is also indicated in the timing diagram of FIG. 8. FIG. 5 indicates schematically a novel decoding arrangement apt for use with the above-described code; an arrangement which exhibits a surprising simplicity, eliminates the usual clocking and code registration determining means, and yet decodes with satisfactory accuracy for most applications. Further, this novel decoder is susceptible of convenient use with supplementing means, such as the "complement checking" arrangement of FIG. 9, the "dual threshold" detecting arrangement of FIG. 10 (described below) and the like.

In general, FIG. 5 shows a bar-character detecting means PD connected to a decoder means DR which interprets the output signals therefrom and also to a sequence detecting means TD the output of which controls (e.g. sequences) decoder DR, indicates code errors and the like. Mark detector PD comprises means responsive to bar marks over all likely transit paths thereof, detecting mark images over a bracketing reference zone PP as with detect bank BC above. Detector PD may also include output amplification means where required. The output signals from detector PD are applied to decoder means DR, being sequentially stored in a memory means DRM therein, DRM being arranged to store bit outputs from selected detector means in PD, the number of output bits stored corresponding to the number of bits per character (here four). Memory DRM is arranged to provide the decoded word output OR at prescribed times, under the control of output control means OC. Control OC is arranged to select prescribed memory locations in DRM and gate them out, either directly or as complemented according to indications from select means S. Select means S is adapted to selectively indicate which memory locations are read out and whether or not they are to be complemented during readout, being controlled by a bit-difference means BD. Difference detector BD may be arranged to compare successive intra character bit signal patterns in memory DRM and, if they are "unlike," (as defined above) to responsively activate memory select means S to invert (i.e. to complement) the bit-signals in output control means OC at readout time. BD may also provide a check for "no-transition" errors, as indicated. Decoder DR is initiated by a "start" signal from TD after the latter has detected a valid "first-bit" and is read out by TD when it determines "last bit" time, such as with a counter or delay means or the like (set to indicate completion of a word). TD may also provide a check for invalid code patterns, such as by indicating erroneous bit-marks at inter-word times (e.g. no blank space after the 4th bit in a 4-bit word—cf. TEG, FIG. 2).

Decoder DR may be enhanced by addition of complement checking means, such as the combined double detecting means PC and complement check means CC in decoder DC of FIG. 9, described above. Similarly, improved detecting means may be arded to increase accuracy, detect faint bit-markings and the like. Such a means, as indicated schematically in FIG. 10, may comprise a plurality (two shown) of mark detecting means $PD_A$, $PD_B$ and associated amplification means $A_A$, $A_B$ arranged to be differently responsive to a bar code image SMI, for instance having different minimum (threshold) detection levels and thus being characterized as a "dual-threshold" (or multi-threshold) detector. Detecting means $PD_A$, $PD_B$ are arranged to respond to the same mark image, for instance, by optically splitting image SMI into two channels and thus focusing separate identical images SMI–A, SMI–B into similar detecting means $PD_A$, $PD_B$, respectively, as shown. The outputs from $PA_A$, $PD_B$ are buffered, at B, to a common decoder means and are both applied to a compare means PDC.

A feature of this arrangement is that the detecting means, including the amplifiers therefor, are made responsive to different minimum-signal levels (e.g. to marks of varying faintness), such as by varying the response sensitivities of detectors PD, varying the amplification thereof (may be adjustable) or the like, to provide a pair of detect outputs applied to the decoder, one high sensitivity, the other low sensitivity. The decoder may interpret these or process them exclusively or in parallel; but, in any event, additional mark detection information is provided and may be used, for instance, for output verification, any variance in outputs indicating questionable decoding reliability. Such a verification may be provided by compare means PDC which is arranged to store the detected signal pattern (from each detecting means PD) for each word and indicate non-identity, such as by providing a check bit for each word, i.e. a "dubious bit," an indicated, indicating an output is ambiguous or invalid. For instance, relatively simple select/gating means may be provided to pass only the low sensitivity (high threshold) output (e.g. from $A_A$) to the decoder, unless it determines that this is ambiguous or meaningless (e.g. faint marks, not detected by $PD_A$) in which case only the other, high sensitivity, output (e.g. from $A_B$) would be passed unless it also were meaningless or ambiguous, in which case, both outputs would be passed.

Turning now to FIG. 6, there is indicated schematically a particular implementation of the arrangement in FIG. 5 comprising a bar code detector stage D including a sensor stage PA which functionally includes the vertical array of photosensors BC arranged in prescribed relation to the bar images (such as $b_1$, shown) and associated amplification means, together with an associated inverter stage IV at the outputs thereof. The amplified outputs from stages PA and IV are then both fed in parallel, being variously combined (as below), to a "current-bit" register CBR and to a "prior-bit" register PBR. Both registers include "center stripping" stages, $CS_c$, $CS_p$, respectively. Further, register CBR has an associated amplification stage $AMP_c$, while companion register PBR includes an associated output memory stage $M_p$ to which set and reset signals are applied, as indicated below. Registers CBR, PBR are adapted, under control of timing signals (KPO, KPI) to accept the outputs from the photosensors in PA, perform a "center-stripping" selection thereof (as was indicated above, regarding code characteristics) and feed modified "selected" outputs comprising selected "current" and "past bits," respectively, in parallel to a tracking stage T. As indicated below, stage T has decision/memory capabilities for comparing the bit signal patterns for each "current-bit" with its predecessor (the "past-bit"), including the relative positions thereof (up, down, middle) and then indicating the occurrence of "bit-transitions." Stage T also stores the direction of the first bit-transition, i.e. whether it was "up" or "down," for purposes of later selectively complementing the binary character output, as indicated below. Detect stages Lo, Hi of tracker T indicate whether these transition patterns are downward or upward, respectively, as detailed below. Every second, third and fourth bit ("other," non-initial, bits) either constitute a "bit-transition" (shift in detector output pattern) or they do not. In some cases there will be no "bit-transition," that is, no change in the position of "selected (stripped) detector outputs" between a given "current bit" in register CBR and the "prior bit," in register PBR. Tracker T is adapted to interpret such "no transition" cases as "middle position detected," at stage MID thereof, the output of MID being led to a complementing storage means FFS and also to a "no-transition" (di-bit error) detect means DBE. FFS preferably comprises complementary flip-flop means arranged so that, responsive to inputs from tracker T (stages MID, Lo, Hi thereof), it may apply binary decoded, bit signals to a shift register SR, these signals having a prescribed binary sense ("1" or "0") according to whether they came from a transition-indicating stage (stage Lo or Hi) or a no-transition-indicating stage (stage MID). FFS is also arranged to emit a binary "one" (or zero) arbitrarily upon indication of "first-bit" (in a word) detected, as detailed below. Thus, when a "first bit" is detected, it will (signal KPI) cause FFS to apply a binary "one" signal to the first memory location I in register SR. When "other" bits are thereafter detected which provide no bit-transition, stage MID will responsively apply a signal to cause FFS to duplicate the prior binary signal in the next memory locations (II, III or IV) of register SR.

If on the other hand, a comparison at stage T of the outputs from registers CBR, PBR indicates a "bit-transition," this will be detected either by the "up" detector stage (Hi) or by the "down" detector stage (Lo), the outputs of which are buffered to "upset" complementary flip-flop stage FFS, so as to apply a binary signal to register SR, this signal being the complement (binary inversion) of the prior binary signal applied to SR. Thus, a "transition-bit" is arbitrarily entered into register SR as the binary opposite of the bit it follows, reflecting an upward or downward shift in "selected sensor" position. Hence, register SR will always represent the initial bit as "one" and the succeeding bits as either binary complements or binary duplicates of one another, depending respectively upon whether they represent a bit transition or not. Register SR is so activated four times under the control of timing signals (KPO, KPI, as indicated below) until the four memory locations therein (I–IV) (one for each word-bit) are full. Register SR is thereafter commanded to transfer the contents of these memory locations to associated locations in an output register OR, this transfer being made directly or, selectably with signal complementation, according to whether or not the associated initial bit-transition was upward, as detailed below, as controlled by gating control means FF′.

Gating control FF′ preferably comprises a flip-flop stage (see FIG. 7C, stages UR, LR) or equivalent bistable means, for gating in the contents of register SR into register OR at 5th bit time as indicated functionally at gate G′, adapted to pass direct transfer signals when FF′ is set and inverting transfer signals, via complementing means CM, when FF′ is reset. FF′ also is especially adapted to be cleared before each character read in and thereafter be exclusively set or reset by an initial "up" or "down" bit-transition, only, being insensitive thereafter to later intra-character transitions. Of course, this might equally well be provided, instead, for the case of "first transition downward," by changing the above-indicated logic accordingly, such as by modifying FFS to generate "negative" binary signals ("zero" indicates mark-pattern-detected) or the like. In the latter case FFS would also generate a "zero" for the initial bit into register SR.

Bit sequence (for each word) is detected at a sequencing stage SM, which operates conventionally to produce sequence control pulses (e.g. pulses KPO, KPI, etc., also indicated above for FIG. 2). In a preferred operating mode as indicated, SM generates such pulses in response to detecting the initial bit in each word. Here, SM comprises a detector means FBD for detecting the initial bit in each character word and responsively activating a multivibrator MVB which, in turn, generates a series of pulses PI, PO of a prescribed duration and period corresponding to the normal time sequence of initial and following bits, respectively. A counter means CTR responsive to MVB may provide initial and following strobe pulses KPI, KPO, respectively, at periods corresponding to normal bit times. Also indicated as responsive to detector FBD is a terminal signal (or "last-bit") generating means LBG adapted to generate the above-described fifth-bit pulse TEG, as well as further termination signals SPU, SPL referred to below. Stage LBG may also apply pulse TEG to a blank detector means NBD, adapted to detect erroneous "5th bar" marks (occurring in inter-character space SP) and provide a "No-Blank" code-error signal (TEGI) responsively. Another error check is provided by "No-Transition" detector stage DBE indicated above at the output of MID and adapted to store all MID outputs for each character and provide a "no-transition" error signal ("*nte*") if these comprise all the character-bits (here four). For verification, an input gate may also be provided to pass MID outputs except when inhibited by a transition output, as indicated, such as when both MID and Lo (or Hi) are activated at the same bit-time. As an alternative to DBE, a check means NTE (shown in phantom) may instead be provided, being adapted to sample the content of each location in register SR and provide "No-bit-Transition" error signal ("*nte*") if all signals therein are identical. As with the simplified decoding arrangement in FIG. 5, the arrangement in FIG. 6 is apt for supplementing with various convenient auxiliary arrangements, such as the "dual-threshold" detection arrangement of FIG. 10 and the "complementing-check" arrangement of FIG. 9.

DETAILED LOGIC EMBODIMENT

FIGS. 7A, 7B, 7C and 7D indicate in detail one logic circuit embodiment of the arrangement according to the invention indicated in FIG. 6 for sensing and decoding the indicated bar code marks. This will be recognized by those skilled in the art as one advantageous technique for implementing the arrangement in FIGS. 5 and 6, other equivalent sub-assemblies and individual elements being substitutable as known in the art. The following Glossary of Logic Signals in Table II will supplement the description of FIGS. 7A–7D.

TABLE II—GLOSSARY OF LOGIC SIGNALS

CHARACTER REGISTRATION:
- C0100–C1000—Photo Cell Channel 1–10 Not C0130–C1030.
- R1G10–R0G10—This Bit Registration Gate 1–10
- R1F–R0F—Preceding Bit Registration Flops 1–10
- RFS10—Registration Flops Set Pulse
- RFR10—Registration Flops Reset
- UG1–UG2—Upper-Bit Gates 1 and 2
- UBG10—Upper-Bit Gated
- MG1–MG2—Middle-Bit Gates 1 and 2
- MBG10—Middle-Bit Gated
- LG1–LG2—Lower-Bit Gates 1 and 2
- LBG10—Lower-Bit Gated
- UBD—Upper-Bit Detected
- LBD—Lower-Bit Detected
- OBG—Other-Bit Gate
- INF 10/00—Information Flop
- INF 30/20—Information Flop Delay Stage
- SFP—Information Register Shift Time
- PSR—Information Register Shift Pulse
- SR4–1—Information Register
- CB1–4—Character Bits 1–4
- SPU—Sample Upper (Register False)
- SPL—Sample Lower (Register True)
- ILC—Illegal Character
- BER—Di-bit Error Clock Control:
- DOC—Document Presence Sensed
- DLE—Document leading Edge Pulse
- SRD—Set Read Period
- RDP—Read Period Flop
- CBR—Character Being Read Flop
- LEG—Leading Edge of Character Pulse
- CKF—Clock Control Flop
- BAR—"Bar" Under Photo Cells RB1—RB2—Bar Aux 1–2
CJ2–CJX—Jumper Card to Allow Triggering Clock on Either 1 Cell or 2 Cells
FMK—Field Mark
U4C, M3C, L3C—Upper, Middle, Lower Channels
NRD—Inhibit Document Reading Clock:
KOD—Clock Phase Adjustment Delay
KOA–KOB—Clock Half Cycles
TMA—Time A—Leading Edge of Pulse
TMB—Time B—Trailing Edge of Pulse
KPI—1st Bit Clock Pulse
KPO—Other Bits Clock Pulse
CED—Character End Clock Pulse FIG. 7A indicates the input stages of the decoding arrangement in FIG. 6. Thus, an array of 10 photosensors comprising stage PA, together with their associated amplifiers are indicated in Section 1–10 of sensor input stage D; each amplified sensor output being applied through isolating gates (preventing loading down of PA) to associated inverter elements I as indicated. The output from detector stage D is applied from various points therein (some being inverted as indicated below) to a Current Bit Register CBR and, in parallel, to a Prior Bit Register PBR. As indicated, register CBR includes an array of 3 and 4 legged input AND gate means arranged in logical combination with various outputs from detector stage D (as indicated by the signal codes) providing the above-mentioned "center-stripping" function (of stages $CS_c$ in FIG. 6). Associated amplifying and inverting means are provided at the output of each AND gate to thus generate a plurality of stripped "selected sensor" outputs from register CBR to be applied to tracking stage T, as indicated in FIG. 6.

Similarly, companion register PBR includes a similar array of AND gates comprising a similar center stripping means CS*p*, practically identical to CS*c* except for a difference in timing signals (KPO vs. RFR, RFS) applied thereto. The outputs from the CS*p* gates are applied to "set" associated bistable storage means, i.e. an associated array of flip-flops (RIF-ROF) comprising "prior-bit"-memory Mp, arranged to be "reset" prior to each bit input. The outputs from register PBR are applied to tracking stage T to be compared positionally with those of register CBR for ascertaining the existence and direction of "bit-transitions."

Tracking (or comparing) stage T basically comprises three very similar transition detectors, namely Middle ("no-transition") Detector MID (FIG. 7D), Upward Detector Hi (FIG. 7B) and Downward Detector Lo (FIG. 7B). These detectors each have a similar logical input comprising the code-indicated input connections to an array of AND gates, buffered to provide an output if the "selected sensors" in CBR are, respectively, the same, higher, or lower, than those of PBR at a given prior time.

As indicated in FIG. 7C, the decoding bi-stable, register-complementing means FFS preferably comprises a pair of complementing flip-flops INF1, INF3 arranged to provide binary input signals to memory locations I–IV in shift register SR, selectively complementing these signals according to a prescribed direction of "bit-transition direction." More particularly, stage FFS is arranged to arbritrarily apply a binary "1" to register SR upon detection of every "first-bit" (signal KP11, from MVB) after functioning either to duplicate the prior binary signal in register SR, i.e. when pulsed by an output signal from tracking section MID (signal MBGI); or to complement the prior binary bit, i.e. when pulsed by outputs from upper or lower tracking sections (sections Lo, Hi providing "bit-transition" signals LBGI, UBGI, respectively). Signal KP11 thus controls FFS to provide a "1" in SR at the detection of the initial bit. A timing signal PSR1 is provided for loading registing SR from FFS, being generated by shift timing stage T–SR indicated in FIG. 7D. Amplifier BERI provides a "di-bit error signal" *nte* ("no-transition"), by detecting that MID output MBGI was detected (after the 4th bit) but "no-transition" output was detected from either Lo or Hi (LBG1, UBG1).

As indicated schematically in FIGS. 6 and 7C, once four memory locations I–IV in register SR have been filled by decoding signal generator FFS, an appropriate timing signal may shift the content thereof to associated memory locations I–IV in output register OR. This transfer is accompanied by the selective "bit-complementing" function indicated above, depending upon the direction of initial bit-transition. Such complementing is indicated schematically as having been performed on the bit content of OR in FIG. 6. The transfer from register SR into register OR is controlled selectively either by upper shift control UR (signal SPU1) or lower shift control LR (SPL1), both being indicated in FIG. 7C. Both registers include input logic arrangements adapted to indicate the occurrence of upward, or downward, initial bit transitions respectively, this indication being stored in appropriate associated bistable means (UBD, LBD, respectively). A characteristic of stages UR, LR is that they are "ON" exclusively, so that when an initial bit-transition signal (e.g. UBGI) "sets" one of the stages (e.g. UBD), the "set output" thereof (e.g. UBDI) keeps it set, while the associated disappearance of the "reset output" thereof (e.g. UBDO) prevents the other stage (LBD) from being thereafter "set" (removing enabling signal UBDO therefrom). In short, each stage is reset at the start of a "character time" and initial bit-transition signals will set one and disable the other.

The details of the output register OR are indicated in FIG. 7D where the four memory locations thereof, i.e. locations OR–I, OR–II, OR–III and OR–IV are individually indicated. Each of these memory locations will be observed to include a logical input arrangement (SR1–SR4) adapted to transfer the contents of an associated location in register SR thereto either directly or as complemented (under control of UR output, namely the upward register control signal SPU1). Thus, in OR–IV, presence of an "UP" signal (SPU1) will invert the bit in SR–IV (SR40) to, here, provide a 4th output bit of "zero" (inversion of bar-detection signals at 4th bit time); whereas a "DOWN" signal (SPL1) will gate out the "true" contents (SR41) of SR–IV to, here, provide a 4th output bit of "one". Also indicated in FIG. 7D is the logical arrangement comprising "no-blank" detector NBD; as well as that for "no-transition error" indicator *nte*, mentioned before. Another error check capable of production by the above decoder system, though not here indicated, is "double-Hi" or "double-Lo" transition errors. That is, since the above decoder detects Hi and Lo bit transitions, it may readily be implemented to store successive Hi and Lo indicating signals (e.g. using register) to indicate two successive upward or downward transitions—an obviously invalid conditions.

OPERATION

The characteristics and operation of the elements indicated above in FIGS. 6 and 7 will be evident to those skilled in the art. However, to further clarify this, an exemplary indication of their operation will be described as follows with reference to the timing diagram in FIG. 8. An illustrative sensing/decoding sequence will be indicated for bar-coded exemplary character SMO in FIG. 8. Reference may also be made to FIGS. 6 and 7 and to Table II for correlation of the elements and signals involved. Character SMO is presumed to comprise an image having a prescribed size and position which registers it relative to photocells PC–3 through PC–8 as is schematically indicated in FIG. 8. Thus, the upper bar portions $B_a$, $B_d$ of image SMO fully cover cell 5 and partially cover cells 4 and 6; while the lower bar portions $B_b$, $B_c$ fully cover cell 7 and partially cover cells 6 and 8. Reference may be had to analogous images SMI (in FIG. 1) and CD (in FIG. 9) and the descriptions thereof for appreciation of the dimensional relations involved. The amplified sensing output from photocells PC–3 through PC–8 is indicated in the timing diagram in FIG. 8 along axes #1–#6, respectively. The output state of relevant portions R5G, R7G of "Current register" CBR are indicated along axes #8, #9, respectively. Sequencing, or timing, signals KPO, KPI for energizing registers CBR and the like are indicated along axis #7. Along axes #10, #11 are indicated the "set" and "reset" signals (RFS, RFR) respectively, associated with the storage means for the above-indicated "ON" photocells, namely, flip-flops R5F, R7F, the states of which are indicated along axes 12, 13 respectively. Axis #14 indicates "compare" operation timing control signals. Axes #17, 19, 15 and 18 indicate, respectively: "no bit-transition" (MBG), the existence of some bit-transition (OBG); a downward transition (LBG) and an upward transition (UBG). Axis #16 (LBD) indicates detection and storage of the fact that the initial bit-transition was downward. Axis #20 shows successive binary output signals (INF10) from complementing flip-flop decoder FFS, these being applied, successively to shift register SR. This sequence of signals illustrates the operation of FFS; whereby bit-transitions cause inversion of successive binary signals. Axes #23 through 26 show the binary signals along axis #20 after transfer, via SR, to memory locations I–IV in register OR. These signals are shown as transferred from register SR uncomplemented since the first bit-transition was downward (see axis #16); not upward. (The opposite was assumed in FIG. 6, however.) Axes #21, 22 indicate register timing signals SPL, SPU, respectively.

The operations indicated by axes 1–26 will now be summarized, referring also to FIGS. 6 and 7. Referring to axes #1–#6, photocells PC–4, PC–5 will be seen to have been activated during the passage of upper bar images $B_a$, $B_d$, being otherwise inactive. Photocell PC–6 remains active during this time and also during the passage of lower bars $B_b$, $B_c$. Photocells PC–7, PC–8, conversely, are active only during the passage of lower bar images $B_b$, $B_c$. Thus, in current-bit register CBR, a center-stripping operation will be logically performed leaving only the output of photosensor PC–5 (axis #12) as the "selected sensor" output during passage of bar image $B_a$ and $B_d$. Conversely, sensor PC–7 (axis #13) is the "selected sensor" during passage of bar images $B_b$ and $B_c$. The strobe signals along axis #7 will be understood as initiating the outputs from register CBR, as indicated by starting of a clock upon detection of the leading edge of the initial bar image to generate five bit-timing pulses in response thereto. A similar timing function is provided for prior bit register PBR, whereby reset pulses RFR are provided to "clear" all of memory locations in PBR as indicated along axis #10; being closely followed by "set" pulses (RFS–axis #11) to "load" these locations and maintain them "ON" until receipt of the following outputs from current bit register CBR for comparison purposes, after which subsequent reset pulses again clear them. The active outputs R5F, R7F or PBR (along axes #12, #13 respectively) are adapted to reflect the prior "bit condition" of companion register CBR and storing this until the next "selected sensor" output appears on CBR for comparison by tracking stage T. Thus, the outputs on axes #12 and #13 indicate, in time sequence, the prior bits associated successively with: sensors PC–5, PC–7, PC–7 and PC–5. Along axis #19 are shown pulses indicating the occurrence of "bit-transitions' adapted to invoke the complementing operation of decoder FFS, as seen below relative along axis #20. Axis #16 shows the generation of a detection signal LBD indicating that the first bit-transition was downward. This "initial transition downward" condition, as mentioned above, means that when the contents of register SR are transferred to output register OR they will not be complemented; whereas they would have been (as in FIG. 6) had the initial transition been upward. Axis #17 shows the detection signal (MBG) indicating for bit $B_c$ a middle (or no-transition) bit pattern sequence detected, after comparison with the position of the "selected sensors" associated with prior bit images $B_b$.

The contents of register SR, (not shown) being applied thereto from complementing flip-flop stage FFS, may be understood as the same as those in Register OR (there being no complementing therebetween), the latter being shown along axes 23–26, as comprising, in order:

A binary *one;* (always a "1" for the first bit); a binary *zero* (or a complementing by FFS of the initial "1" bit, in response to the indication of a "bit-transition' by OBG signal); a binary *zero,* (reflecting "no transition," whereby FFS merely duplicates the prior, "zero," state); and a binary *one* (indicating a complementing of the prior "zero" by FFS, again in response to the indication of a bit-transition).

The controlling signals controlling the transfer of bits in SR to OR are indicated along axes 21, 22, where a "downward transition detected" control signal (SPL) is shown (axis 21) as coming "on" first. Signal SPL thus disables the intra-character operation thereafter of companion control UR, the output of which (SPU) is therefore indicated as inactive (along axis #22), for this character time.

Those skilled in the art will recognize that the above-described encoding scheme and associated detector means derive the aforementioned features of novelty and advantage, as well as other advantages. It will be recognized that the aforementioned code advantageously places a bit of information and its complement simultaneously under a "read-window." Such complementary bits can effect detection of errors related to mis-shaping of the bar marks, such as smudging, ghosting, bar-spread clipping, and the like. Only a very unlikely concurrence of such errors can prevent detection, such as, for example, the foreshortening of a printed bar together with a character skew and smudge or the like coincidentally occurring in companion "half-bit zones." Also, as mentioned, the code is self-synchronizing on a character, for instance, allowing clocking simply by detection of the leading edge of the first bar in a character and then sampling at fixed intervals thereafter. The code also relieves the central processor of the task of checking for character validity, effecting this by a simple arrangement in the detector. Related to such self-synchronization is the self-centering (or self-locating) characteristic, whereby, unlike prior art code schemes, no center-line detection is required. The code advantageously provides a high character-density and a low required number of print hammer strikes per character. Of course, the aforedescribed encoding scheme may be modified considerably within contemplation of the invention. For instance, in certain cases, the vertical di-bit arrangement may be replaced by other vertically-related marks along upper and lower tracks, the marks being horizontally adjacent. Likewise, the sizes of the bit cells within a character, and of the "half-bit" mark zones therein, may be varied somewhat from that shown in FIG. 2, for instance, cells I, II, III and IV being indicated, as comprising relatively equal-area strips or zones arranged along a common "read-direction." For instance, the complementing 0, 1 zones of a bit-cell need not be equal in area, but may be unequal. For instance, the upper two-thirds of a cell may comprise the zone for a "one"mark and the lower one-third thereof comprise the zone for a "zero" mark as long as the pattern is kept consistent for all cells and as long as the minimum mark height is at least large enough to successfully charge at least one detecting photocell. Also, in certain cases, the width of cells within a character may be unequal. For instance, according to a modification feature of the invention, it may be preferred for some applications to provide cells of increasing width within a character. Thus, for example, in FIG. 2, instead of each cell constituting 25% of character width (along direction M') cell #1 might comprise about 10%, cell #2 about 20%, cell #3 about 30%, and cell #4 about 40%. Those skilled in the art will appreciate that this will make it easier to adjust the sampling intervals for cells 2, 3, 4 to times that will coincide with passage of these cells, despite variations in transport speeds, mark sizes and the like. While the "marks" are described as constituting a prescribed discontinuity in background reflectance, they may comprise other such discontinuities—e.g. translucence, radiation, mechanical insulation (for brush-sensing) etc. Such a discontinuity may be used for one or both di-bit zones.

The aforementioned detector means may also be modified, to accommodate code changes, such as those aforementioned and otherwise. For instance, the "dual-threshold" arrangement in FIG. 10 may equivalently comprise a single detector means ($PD_A$), the output therefrom feeding a plurality of parallel different "minimum-sensitivity" (threshold) signal amplifying lines, or the like. Also, while the described decoder means are especially apt for decoding vertical di-bit patterns, they may sometimes be apt for other different code patterns. As mentioned the decoder means of the invention dispenses with the common code-position determining and referencing means, such as "center-line detectors." Thus, the principles of the invention described in the above embodiment may be implemented in a number of different ways evident to those skilled in the art.

While, in accordance with the provisions of the statutes, there have been illustrated and described above, the best forms of the invention known, it will be apparent to those skilled in the art that changes may be made in the form of the apparatus and the encoding scheme in the arrangement of parts and the like without departing from the spirit of the invention, as set forth in the appended claims; and that, in certain cases, some features of the invention may be used to advantage, or replaced, with or without a corresponding change or replacement of other features.

Having now described the invention, what is claimed as novel and is to be secured by Letters Patent is:

1. An improved code reading apparatus including decoder means for interpreting prescribed character-encoding mark patterns, wherein each said pattern comprises a number of adjacent cells, said cells comprising a pair of vertically-related mark-zones, the marks arranged along a pair of parallel tracks, one of said zones being exclusively impressed with a di-bit mark; wherein the imaged position of said patterns is characteristically variable relative to said decoder means, said decoder means being relatively insensitive to such variations in position and requiring no independent code-position-referencing means, said apparatus comprising:

at least three like detector means arranged along a prescribed reading axis so as to bracket a number of likely transit paths for said patterns; memory means connected to the outputs of said detector means and adapted to store successive character-indicating bit-signals therefrom; bit-difference detector means, connected to the outputs of said detector means and also to a prescribed portion of said memory means, to detect prescribed changes in said output signal patterns; said bit-difference detector means including logic circuit comparing means to compare each output signal pattern with the prior such pattern as indicated by said memory means, and logic circuit indicating means to responsively indicate prescribed shifts thereof; and output control means connected to gate the output of said memory means to utilization means, selectively, under the control of said bit-difference detector means.

2. The combination as recited in claim 1 wherein said patterns comprise horizontally-adjacent vertical di-bit bar marks arranged to represent a prescribed number of character bits; wherein said detector means comprises photodetector means; wherein said memory means includes a number of memory-bit cell locations therein corresponding to said prescribed number of bits; wherein said output control means includes complementing means adapted to selectively complement the character indicating bit-signals emanating from said memory means under control of said difference detector means; and wherein is also included bit sequence indicator means connected to the output of said photodetector means and adapted to sequence the operation of said memory means, said difference detector means and said output means being reset as each character is read, said indicator means being re-referenced, self-synchronizingly, with each sequence of character-indicating output signals.

3. The combination as recited in claim 1 wherein are also included:

alternate checking means including duplicate detector means and detector-signal comparing means connected to the outputs of both said detector means, said comparing means being adapted to indicate valid di-bitness for each character according to whether or not the outputs of said detector means are complementary.

4. The combination as recited in claim 1 wherein are included:

first detector output means having a first sensitivity; second detector output means having a second sensitivity, different from said first sensitivity; both of said output means being connected to transmit the outputs of said detector means to said utilization means under different threshold levels; and also compare means arranged at the outputs of both said output means and adapted to indicate the relative states thereof.

5. The combination as recited in claim 1 wherein said detector means have their outputs connected in parallel to said memory means, said memory means including a set of memory locations corresponding in number with the number of bits in said character patterns; and wherein said output control means functions to transmit character-indicating sets of bit-signals to said utilization means, either directly or invertingly, under control of said difference detector, according to a prescribed type of shift in the patterns of successive bit outputs from said detector means.

6. In a character-interpreting machine adapted to binarily decode vertical di-bit character patterns passing across a portion of a prescribed reading zone, the combination therein of:

a plurality of at least three like detector means arranged along a prescribed axis so as to bracket said zone, each of the detector means having a read-aperture no larger than the image of said di-bit marks thereat; memory means connected in parallel to the outputs of said detector means, said memory means being adapted to temporarily store character-indicating signals corresponding to said outputs; means for examining successive bit-indicating output patterns from said detector means and for also indicating a prescribed change therein; and means for unloading said character-indicating signals in said memory means for transmission to utilization means and for selectively complementing the binary state of said signals in response to indication of said change by said examining means.

7. The combination as recited in claim 6 wherein said memory means is adapted to store successive bit outputs from each of said detector means; wherein said examining means includes auxiliary memory means adapted to store bit outputs from said detector means representing a prior bit pattern and also includes transition detector means adapted to provide directional signals indicating upward and downward shifts in the position of successive bit patterns from said detector means; and wherein said unloading means includes signal generating means adapted to generate binary signals corresponding to said bit outputs, the binary state thereof being inverted in response to a prescribed one of said directional signals.

8. The combination as recited in claim 7 wherein said unloading means also includes output memory means adapted to store successive character-indicating bit signals from said generating means and includes readout means for gating out the contents of said output memory means to utilization means either directly or invertingly according to whether a prescribed one of said directional signals within a character indicates upward or downward transitions.

9. The combination as recited in claim 8 wherein is also included sequenching means connected to the outputs of said detector means and adapted to responsively indicate character-starting and character-terminating times, said signals being applied controllingly to said memory means, said examining means and said unloading means.

10. The combination as recited in claim 7 wherein said memory means includes a storage logic arrangement adapted to center select successive bit outputs from said detector means, inhibiting prescribed outboard detector outputs in a bit pattern.

11. The combination as recited in claim 10 wherein is included inter-character-space checking means, adapted to examine said detector outputs after character-termination time, responsive to said sequencing means, and providing indication of character pattern errors when bit outputs are then present.

12. The combination as recited in claim 7 wherein is also included transition-checking means for checking for occurrence of di-bit transitions, responsive to the occurrence of said directional signals.

13. The combination as recited in claim 7 wherein said generating means includes a complementing flip-flop stage adapted to provide a prescribed unvarying binary output and also to invert this output upon occurrence of said directional signals.

14. The combination as recited in claim 8 wherein said readout means includes storage means adapted to be placed in one of two bistable conditions according to the direction of the initial one of said directional signals within a character and to responsively control the selective inverting readout of said output memory means.

15. Apparatus for sensing uniform character-representing encoding marks recorded on a document, said apparatus comprising:

at least three mark sensing devices arranged to provide a line of adjacent scanning areas, each area being smaller than said marks; document feeding means operative to feed documents, so encoded, transversely, past a portion of said line so that bit-indicating ones of said marks are viewed in sequence by some of said sensing devices; electronic memory means connected to the output of each of said sensing devices for storing the outputs thereof at successive bit times; bit difference detector means to detect prescribed changes in said outputs; said bit-difference detector means including logic circuit comparing means to compare each output with the prior such output, as indicated by said memory means, and logic circuit indicating means to responsively indicate prescribed shifts thereof; center selection logic means for inhibiting prescribed outboard sensing device outputs for a sensed mark; and readout control means adapted to transmit successive character-representing signals to utilization means, said signals binarily reflecting successive bit patterns in said memory means and being inverted to indicate a prescribed directional intra-character shift in said patterns.

16. Apparatus for providing binary output signals characteristic of symbols composed of a plurality of vertically di-bitted contrasting impressions, said apparatus comprising:

means for translating said impressions in di-bit sequence past a prescribed reading axis; detecting means arranged along said axis to bracket at least three translation paths and adapted to provide output signals corresponding to the passage of said impressions past said axis at successive bit times; means for interpreting said output signals to derive a prescribed sequence of binary character-indicating bit signals, said means including complementing means for inverting said bit-signals in response to prescribed changes in the pattern of said output signals; and means for transmitting said bit-signals in character-indicating sets to utilization means, including means for selectively inverting said signals binarily within a character according to a prescribed directional shift of said output signal pattern.

17. The combination as recited in claim 15 wherein is also included means responsive to said sensing outputs for generating a control signal indicative of vertical positional shifts in the pattern thereof; and means responsive to said control signals for complementing said character signals.

References Cited

UNITED STATES PATENTS

| | | | |
|---|---|---|---|
| 2,337,553 | 12/1943 | Hofgaard. | |
| 3,104,369 | 9/1963 | Rabinow et al. | 40—146.3 |
| 3,106,706 | 10/1963 | Kolanowski et al. | |
| 3,211,470 | 10/1965 | Wilson | 235—61.12 |
| 3,310,658 | 3/1967 | Ryer | 235—61.11 |
| 3,316,392 | 4/1967 | Bailey et al. | 340—146.3 |
| 3,322,935 | 5/1967 | Wyke et al. | |

MAYNARD R. WILBUR, Primary Examiner

T. J. SLOYAN, Assistant Examiner

U.S. Cl. X.R.

250—219